US012554351B2

(12) United States Patent
Lee et al.

(10) Patent No.: US 12,554,351 B2
(45) Date of Patent: Feb. 17, 2026

(54) DISPLAY APPARATUS HAVING A TOUCH ELECTRODE INCLUDING BLACK MATRIX ELECTRODES

(71) Applicant: LG Display Co., Ltd., Seoul (KR)

(72) Inventors: HwiDeuk Lee, Paju-si (KR); DeukSu Lee, Paju-si (KR); JaeGyun Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/949,580

(22) Filed: Nov. 15, 2024

(65) Prior Publication Data

US 2025/0271955 A1  Aug. 28, 2025

(30) Foreign Application Priority Data

Feb. 27, 2024  (KR) .................. 10-2024-0027945

(51) Int. Cl.
*G06F 3/041* (2006.01)
(52) U.S. Cl.
CPC .................. *G06F 3/0412* (2013.01)
(58) Field of Classification Search
CPC .................................. G06F 3/0412
See application file for complete search history.

(56) References Cited

U.S. PATENT DOCUMENTS

| 10,381,419 | B2 | 8/2019 | Lee |
| 2016/0351631 | A1 | 12/2016 | Lee |
| 2021/0232250 | A1* | 7/2021 | Yang ............... H10K 59/873 |

FOREIGN PATENT DOCUMENTS

| KR | 10-2020-0080617 A | 7/2020 |
| KR | 10-2378893 B1 | 3/2022 |
| KR | 10-2023-0018894 A | 2/2023 |

* cited by examiner

*Primary Examiner* — Yaron Cohen
(74) *Attorney, Agent, or Firm* — Fenwick & West LLP

(57) ABSTRACT

A display apparatus includes touch electrodes overlapping a black matrix. The display apparatus comprising an array panel provided with pixels including opening portions through which light is output; and a touch panel provided on the array panel and including touch electrodes, wherein the touch panel includes: color filters provided to overlap the pixels; an insulation layer provided on the color filters; a black matrix provided on the insulation layer and including black matrix lines surrounding an area corresponding to the opening portions; black matrix electrodes overlapping the black matrix lines; and an encapsulation substrate provided on the black matrix, wherein each of the touch electrodes includes at least two black matrix electrodes connected to each other.

17 Claims, 17 Drawing Sheets

DISPLAY APPARATUS HAVING A TOUCH ELECTRODE INCLUDING BLACK MATRIX ELECTRODES

CROSS-REFERENCE TO RELATED APPLICATION

This application claims the benefit of the Republic of Korea Patent Application No. 10-2024-0027945 filed on Feb. 27, 2024, which is hereby incorporated by reference in its entirety.

BACKGROUND

Field of Technology

The present disclosure relates to a display apparatus.

Discussion of the Related Art

Display apparatuses are mounted on or provided in electronic products such as televisions, monitors, notebook computers, smart phones, tablet computers, electronic pads, wearable devices, watch phones, portable information devices, navigation devices, or vehicle control display devices, etc., to display images. Pixels are provided in a display panel configuring a display apparatus, and an opening portion through which light is output is provided in each of the pixels.

Touch electrodes for sensing a touch can be provided in the display panel.

However, the larger the size of the display panel, the more difficult it is to provide touch electrodes on the display panel.

SUMMARY

Accordingly, the present disclosure is directed to providing a display apparatus that substantially obviates one or more problems due to limitations and disadvantages of the related art.

An aspect of the present disclosure is directed to providing a display apparatus including touch electrodes overlapping a black matrix.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description as well as the appended drawings.

To achieve these and other advantages and in accordance with the purpose of the disclosure, as embodied and broadly described herein, there is provided a display apparatus comprising an array panel provided with pixels including opening portions through which light is output; and a touch panel provided on the array panel and including touch electrodes, wherein the touch panel includes: color filters provided to overlap the pixels; an insulation layer provided on the color filters; a black matrix provided on the insulation layer and including black matrix lines surrounding an area corresponding to the opening portions; black matrix electrodes overlapping the black matrix lines; and an encapsulation substrate provided on the black matrix, wherein each of the touch electrodes includes at least two black matrix electrodes connected to each other.

It is to be understood that both the foregoing general description and the following detailed description of the present disclosure are example and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
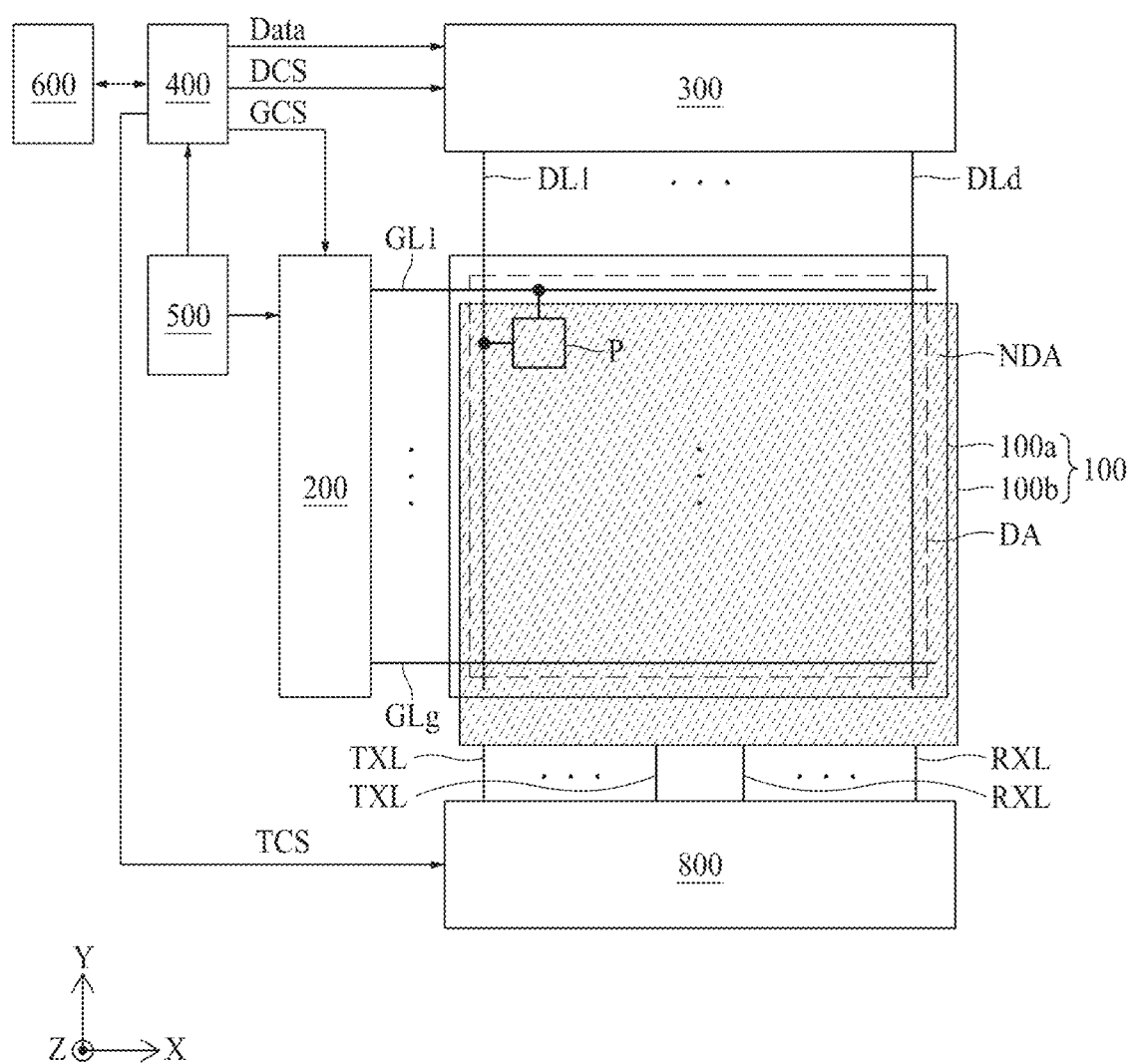
FIG. 1 is an exemplary diagram illustrating a configuration of a display apparatus according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure can, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present disclosure are used, another part can be added unless "only" is used. The terms of a singular form can include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case that is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another and may not define order of sequence. For example, a first element could be termed a second element, and, similarly, a second element could be termed a first element, without departing from the scope of the present disclosure.

In describing elements of the present disclosure, the terms "first," "second," "A," "B," "(a)," "(b)," etc. can be used. These terms are intended to identify the corresponding elements from the other elements, and basis, order, or number of the corresponding elements should not be limited by these terms. The expression that an element is "connected," "coupled," or "adhered" to another element or layer should be understood the element or layer cannot only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. Also, the term "can" used herein includes all meanings and definitions of the word "may."

Features of various embodiments of the present disclosure can be partially or overall coupled to or combined with each other, and can be variously inter-operated with each other and driven technically as those skilled in the art can sufficiently understand. The embodiments of the present disclosure can be carried out independently from each other, or can be carried out together in co-dependent relationship.

Hereinafter, embodiments of the present disclosure will be described in detail with reference to the accompanying drawings.

Figure 2:
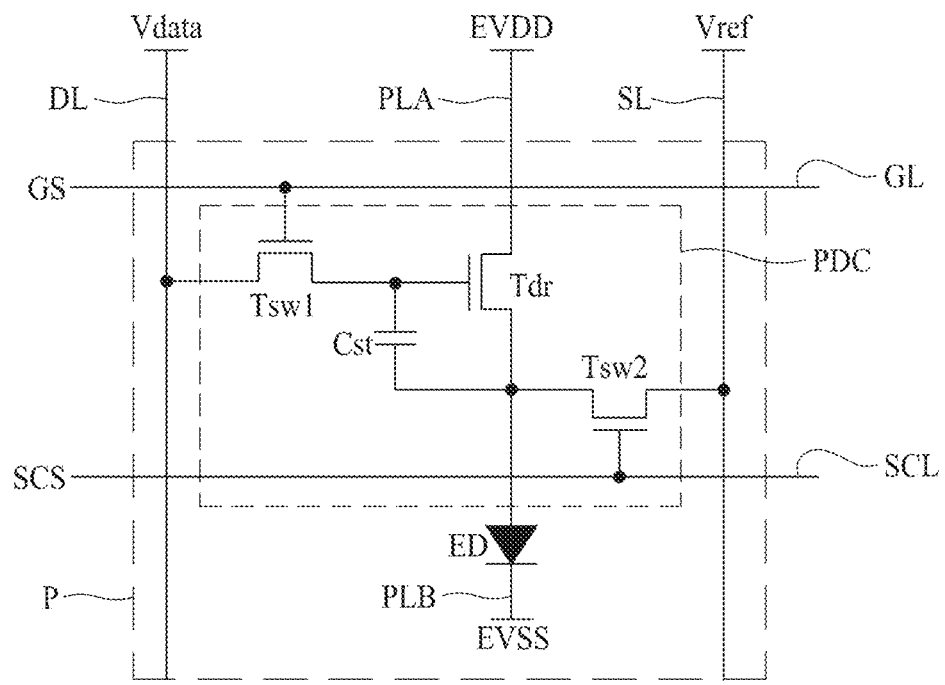
FIG. 2 is an exemplary diagram illustrating a structure of a pixel applied to a display apparatus according to an embodiment of the present disclosure.
Figure 3:
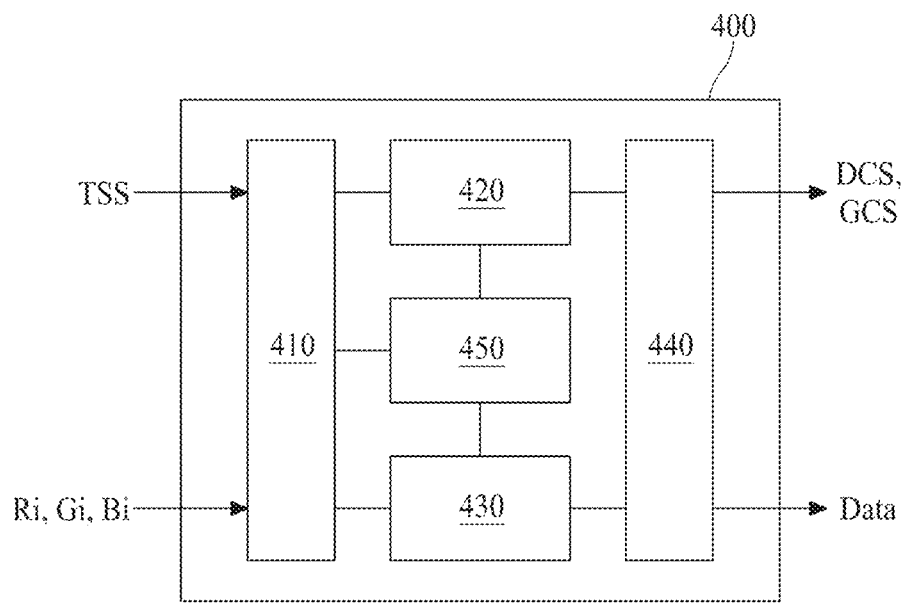
FIG. 3 is an exemplary diagram illustrating a structure of a control driver applied to a display apparatus according to an embodiment of the present disclosure.
Figure 4:
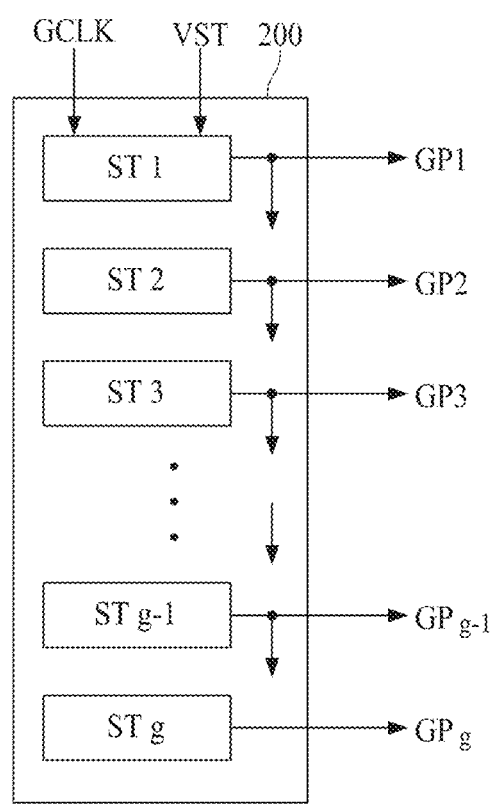
FIG. 4 is an exemplary diagram illustrating a structure of a gate driver applied to a display apparatus according to an embodiment of the present disclosure.
Figure 5:
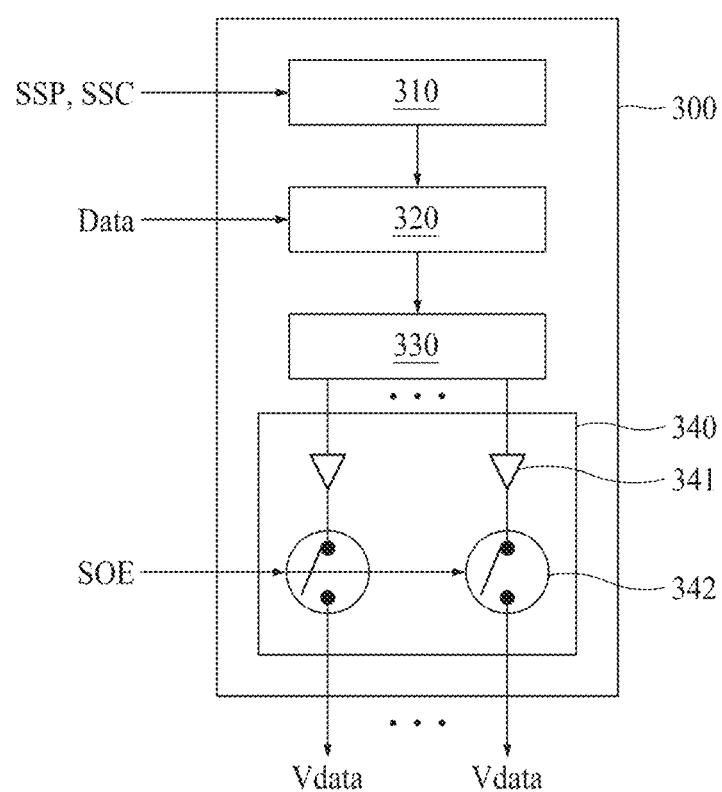
FIG. 5 is an exemplary diagram illustrating a structure of a data driver applied to a display apparatus according to an embodiment of the present disclosure.

FIG. 1 is an exemplary diagram illustrating a configuration of a display apparatus according to an embodiment of the present disclosure, FIG. 2 is an exemplary diagram illustrating a structure of a pixel applied to a display apparatus according to an embodiment of the present disclosure, FIG. 3 is an exemplary diagram illustrating a structure of a control driver applied to a display apparatus according to an embodiment of the present disclosure, FIG. 4 is an exemplary diagram illustrating a structure of a gate driver applied to a display apparatus according to an embodiment of the present disclosure, and FIG. 5 is an exemplary diagram illustrating a structure of a data driver applied to a display apparatus according to an embodiment of the present disclosure.

A display apparatus according to an embodiment of the present disclosure can be used as various kinds of electronic devices. Electronic devices can be, for example, televisions, monitors, etc.

A display apparatus according to an embodiment of the present disclosure, as illustrated in FIG. 1, can include a display panel 100 which includes a display area DA displaying an image and a non-display area NDA provided outside the display area DA, a gate driver 200 which supplies gate signals GS to a plurality of gate lines GL1 to GLg provided in the display area DA of the display panel 100, a data driver 300 which supplies data voltages Vdata to a plurality of data lines DL1 to DLd provided in the display area DA of the display panel 100, a touch driver 800 which supplies a touch driving signal to touch electrodes provided in the display panel 100, a control driver 400 which controls driving of the gate driver 200, the data driver 300, and the touch driver 800, and a power supply unit 500 which supplies power to the control driver 400, the gate driver 200, the data driver 300, the touch driver 800, and the display panel 100.

First, the display panel 100 can include an array panel 100*a* on which an image is displayed and a touch panel 100*b* in which touch electrodes for touch sensing are provided.

First, the array panel 100*a* can include a display area DA and a non-display area NDA. Gate lines GL1 to GLg, data lines DL1 to DLd, and pixels P can be provided in the display area DA. Accordingly, an image can be displayed in the display area DA. Here, g and d are natural numbers. The non-display area NDA can surround the outer periphery of the display area DA.

The array panel 100*a* can be a light emitting display panel including light emitting devices, a liquid crystal display panel using liquid crystal, or a panel applied to various types of display apparatus currently in use.

Hereinafter, for convenience of description, a light emitting display panel including light emitting devices is described as an example of the array panel 100a applied to a display apparatus according to an embodiment of the present disclosure.

When the array panel is a light emitting display panel, the pixel P included in the array panel 100a can, as illustrated in FIG. 2, include a pixel driving circuit PDC which includes a switching transistor Tsw1, a storage capacitor Cst, a driving transistor Tdr, and a sensing transistor Tsw2, and a light emitting device ED connected to the pixel driving circuit PDC.

A first terminal of the driving transistor Tdr can be connected to a first voltage supply line PLA through which a first voltage EVDD is supplied, and a second terminal of the driving transistor Tdr can be connected to the light emitting device ED.

A first terminal of the switching transistor Tsw1 can be connected to a data line DL, a second terminal of the switching transistor Tsw1 can be connected to a gate of the driving transistor Tdr, and a gate of the switching transistor Tsw1 can be connected to a gate line GL.

A data voltage Vdata can be supplied through the data line DL from the data driver 300. A gate signal GS can be supplied through the gate line GL from the gate driver 200. The gate signal GS can include a gate pulse GP for turning on the switching transistor Tsw1 and a gate-off signal for turning off the switching transistor Tsw1.

The sensing transistor Tsw2 can be provided for measuring a threshold voltage of the driving transistor Tdr or mobility of an electrical charge (for example, an electron), or supplying a reference voltage Vref to the pixel driving circuit PDC. A first terminal of the sensing transistor Tsw2 can be connected to the second terminal of the driving transistor Tdr and the light emitting device ED, a second terminal of the sensing transistor Tsw2 can be connected to a sensing line SL through which the reference voltage Vref is supplied, and a gate of the sensing transistor Tsw2 can be connected to a sensing control line SCL through which a sensing control signal SCS is supplied.

The sensing line SL can be connected to the data driver 300 and can be connected to the power supply unit 500 through the data driver 300. For example, the reference voltage Vref supplied from the power supply unit 500 can be supplied to the pixels through the sensing line SL, sensing signals transmitted from the pixels P can be converted into digital sensing signals in the data driver 300, and the digital sensing signals can be transmitted to the control driver 400.

The light emitting device ED can include a first electrode supplied with a first voltage EVDD through the driving transistor Tdr, a second electrode connected to a second voltage supply line PLB through which a second voltage is supplied, and a light emitting layer provided between the first electrode and the second electrode. The first electrode can be an anode and the second electrode can be a cathode.

The structure of the pixel P applied to a display apparatus according to an embodiment of the present disclosure is not limited to the structure illustrated in FIG. 2. Accordingly, the structure of the pixel P can be changed to various shapes.

The touch panel 100b can perform a function of sensing a touch, and for this purpose, the touch panel 100b can include touch electrodes.

When the touch panel 100b uses a mutual-cap method, the touch panel can include touch driving electrodes and touch receiving electrodes.

In this case, each of the touch driving electrodes can include at least one touch electrode, and each of the touch receiving electrodes can include at least one touch electrode. When the touch panel 100b uses a self-cap method, the touch panel 100b can include touch electrodes that are driven independently of each other.

Hereinafter, for convenience of description, a touch panel using the mutual-cap method will be described as an example of the touch panel 100b applied to a display apparatus according to an embodiment of the present disclosure.

In the touch panel 100b using the mutual-cap method, the touch driving electrodes can be connected to the touch driver 800 through touch driving electrode lines TXL, and the touch receiving electrodes can be connected to the touch driver 800 through touch receiving electrode lines RXL.

The control driver 400 can realign input image data Ri, Gi, and Bi transmitted from an external system 600 by using a timing synchronization signal TSS transmitted from the external system and can generate a data control signal DCS which is to be supplied to the data driver 300 and a gate control signal GCS which is to be supplied to the gate driver 200.

To this end, as illustrated in FIG. 3, the control driver 400 can include a data aligner 430 (e.g., a circuit) which realigns input image data Ri, Gi, and Bi to generate image data Data, a control signal generator 420 which generates the gate control signal GCS and the data control signal DCS by using the timing synchronization signal TSS, an input unit 410 (e.g., a circuit) which transmits the timing synchronization signal TSS transmitted from the external system 600 to the control signal generator 420 and transmits the input image data Ri, Gi, and Bi transmitted from the external system 600 to the data aligner 430, and an output unit 440 (e.g., a circuit) which supplies the data driver 300 with the image data Data generated by the data aligner 430 and the data control signal DCS generated by the control signal generator 420 and supplies the gate driver 200 with the gate control signal GCS generated by the control signal generator 420.

The control signal generator 420 can generate a power control signal supplied to the power supply unit 500.

The control signal generator 420 can generate a touch control signal TCS supplied to the touch driver 800.

The control driver 400 can further include a storage unit 450 (e.g., memory) for storing various information. The storage unit 450 can be included in the control driver 400 as illustrated in FIG. 3, but can be separated from the control driver 400 and provided independently.

The external system 600 can perform a function of driving the control driver 400 and an electronic device.

For example, when the electronic device is a television (TV), the external system 600 can receive various kinds of sound information and image information over a communication network and can transmit the received image information to the control driver 400. For example, the external system 600 can convert the image information into input image data Ri, Gi, and Bi and transmit the input image data Ri, Gi, and Bi to the control driver 400.

The power supply unit 500 (e.g., a circuit) can generate various powers and supply the generated powers to the control driver 400, the gate driver 200, the data driver 300, the touch driver 800, and the display panel 100.

The gate driver 200 can be directly embedded into the non-display area NDA by using a gate-in panel (GIP) type, or the gate driver 200 can be provided in the display area DA in which light emitting devices ED are provided, or the gate driver 200 can be provided on a chip on film mounted in the non-display area NDA.

The gate driver 200 can supply gate pulses GP1 to GPg to the gate lines GL1 to GLg.

When a gate pulse GP generated by the gate driver 200 is supplied to a gate of the switching transistor Tsw1 included in the pixel P, the switching transistor Tsw1 can be turned on. When the switching transistor Tsw1 is turned on, data voltage Vdata supplied through a data line DL can be supplied to the pixel P.

When a gate-off signal generated by the gate driver 200 is supplied to the switching transistor Tsw1, the switching transistor Tsw1 can be turned off. When the switching transistor Tsw1 is turned off, a data voltage cannot be supplied to the pixel P any longer.

The gate signal GS supplied to the gate line GL can include the gate pulse GP and the gate-off signal.

To supply gate pulses GP1 to GPg to gate lines GL1 to GLg, the gate driver 200, as illustrated in FIG. 4, can include stages ST1 to STg connected to gate lines GL1 to GLg.

Each of the stages ST1 to STg can be connected to one gate line GL, but can be connected to at least two gate lines GL.

In order to generate gate pulses GP1 to GPg, a gate start signal VST and at least one gate clock GCLK which are generated by the control signal generator 420 can be transferred to the gate driver 200. For example, the gate start signal VST and the at least one gate clock GCLK can be included in the gate control signal GCS.

One of the stages ST1 to STg can be driven by a gate start signal VST to output a gate pulse GP to a gate line GL. The gate pulse GP can be generated by a gate clock GCLK.

At least one of signals output from a stage ST where a gate pulse is output can be supplied to another stage ST to drive another stage ST. Accordingly, a gate pulse can be output in another stage ST.

For example, the stages ST can be driven sequentially to sequentially supply the gate pulses GP to the gate lines GL.

The data driver 300 can supply data voltages Vdata to the data lines DL1 to DLd.

To this end, the data driver 300, as illustrated in FIG. 5, can include a shift register 310 (e.g., a circuit) which outputs a sampling signal, a latch 320 which latches image data Data received from the control driver 400, a digital-to-analog converter 330 which converts the image data Data, transmitted from the latch 320, into a data voltage Vdata and outputs the data voltage Vdata, and an output buffer 340 which outputs the data voltage, transmitted from the digital-to-analog converter 330, to the data line DL on the basis of a source output enable signal SOE.

The shift register 310 can output the sampling signal by using the data control signal DCS received from the control signal generator 420. For example, the data control signals DCS transmitted to the shift register 310 can include a source start pulse SSP and a source shift clock signal SSC.

The latch 320 (e.g., a circuit) can latch image data Data sequentially received from the control driver 400, and then output the image data Data to the digital-to-analog converter 330 at the same time on the basis of the sampling signal.

The digital-to-analog converter 330 can convert the image data Data transmitted from the latch 320 into data voltages Vdata and output the data voltages Vdata.

The output buffer 340 can simultaneously output the data voltages Vdata transmitted from the digital-to-analog converter 330 to data lines DL1 to DLd of the display panel 100 on the basis of the source output enable signal SOE transmitted from the control signal generator 420.

To this end, the output buffer 340 can include a buffer 341 which stores the data voltage Vdata transmitted from the digital-to-analog converter 330 and a switch 342 which outputs the data voltage Vdata stored in the buffer 341 to the data line DL on the basis of the source output enable signal SOE.

For example, when the switches 342 are turned on based on the source output enable signal SOE simultaneously supplied to the switches 342, the data voltages Vdata stored in the buffers 341 can be supplied to the data lines DL1 to DLd through the switches 342.

The data voltages Vdata supplied to the data lines DL1 to DLd can be supplied to pixels P connected to a gate line GL supplied with a gate pulse GP.

Finally, the touch driver 800 can supply a touch driving signal to the touch panel 100b, and can detect whether a touch is present by using touch sensing signal received from the touch panel 100b.

Figure 6:
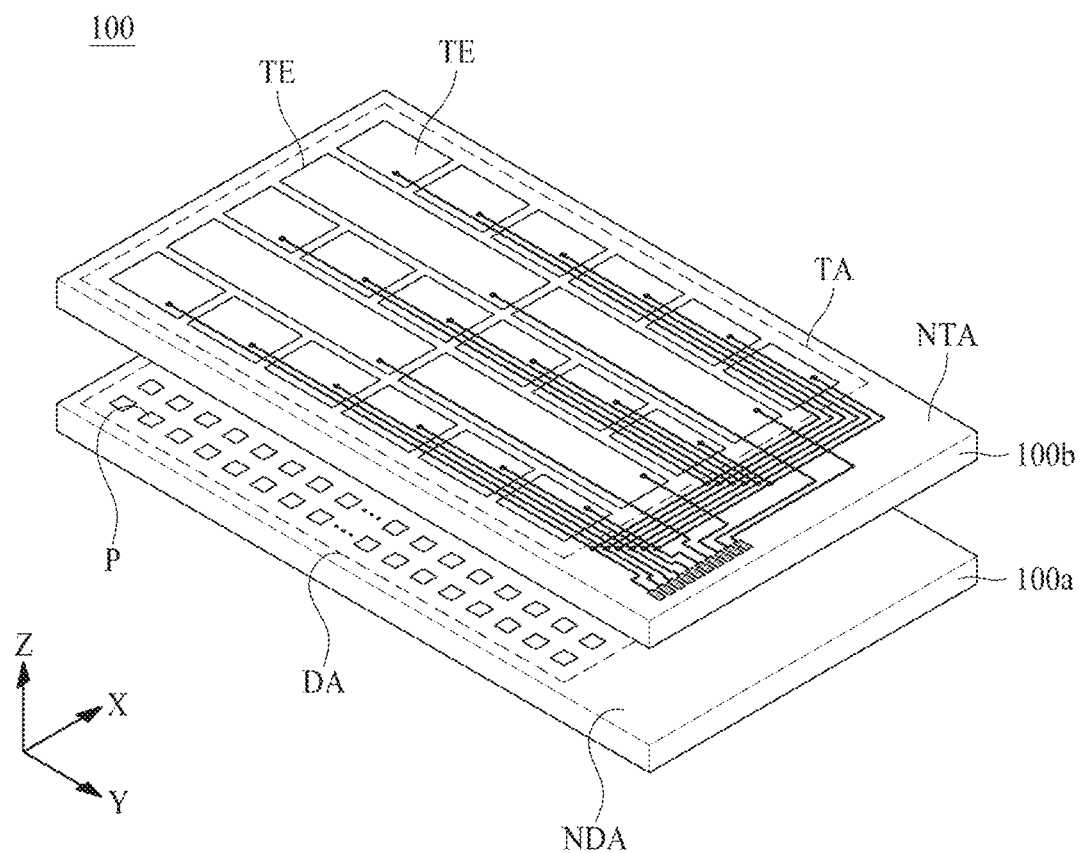
FIG. 6 is an exemplary diagram illustrating a structure of a display panel applied to a display apparatus according to an embodiment of the present disclosure.
Figure 7:
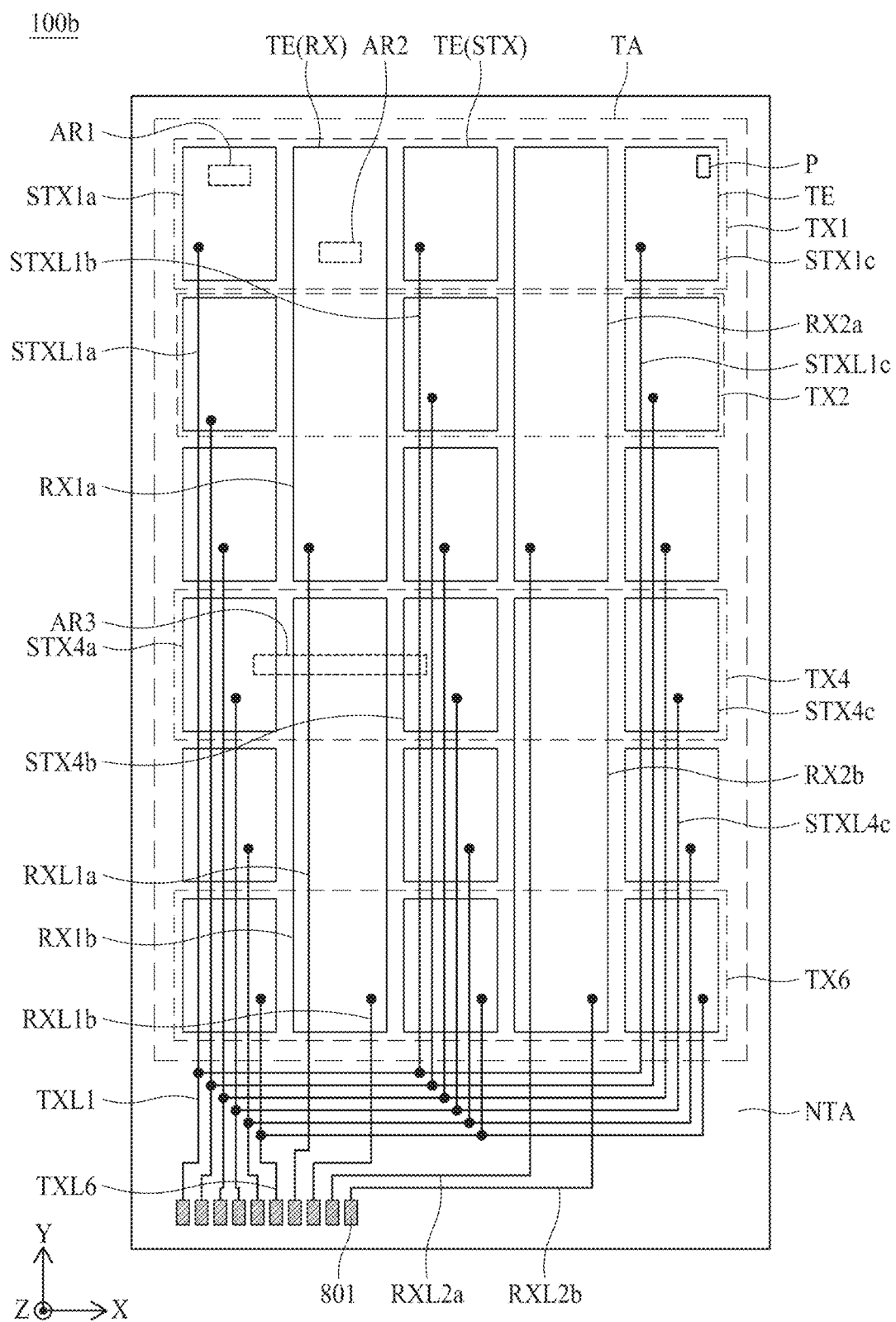
FIG. 7 is an exemplary diagram illustrating a structure of a touch panel illustrated in FIG. 6 according to an embodiment of the present disclosure.
Figure 8:
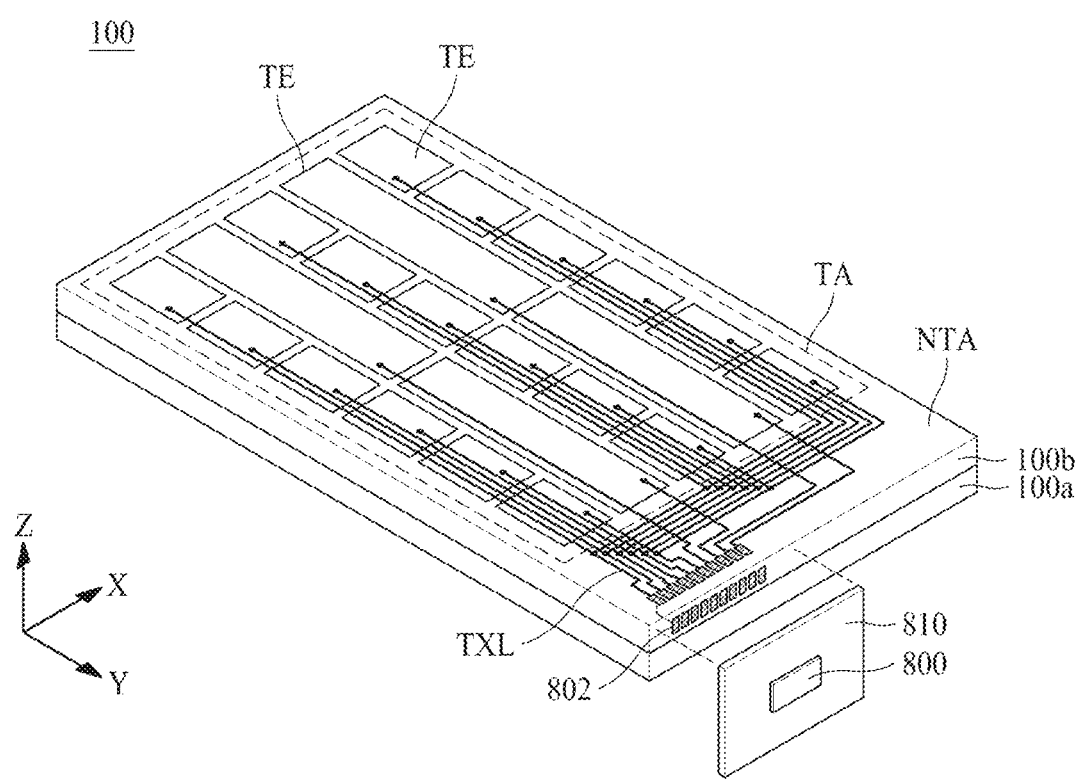
FIG. 8 is a perspective view of a display panel applied to a display apparatus according to an embodiment of the present disclosure.

FIG. 6 is an exemplary diagram illustrating a structure of a display panel applied to a display apparatus according to an embodiment of the present disclosure, FIG. 7 is an exemplary diagram illustrating a structure of a touch panel illustrated in FIG. 6 according to an embodiment of the present disclosure, and FIG. 8 is a perspective view of a display panel applied to a display apparatus according to an embodiment of the present disclosure.

First, referring to FIG. 6, a display apparatus according to an embodiment of the present disclosure includes a display panel 100.

The display apparatus according to an embodiment of the present disclosure can sense a touch, and to this end, a finger or a touch pen can be in contact with a display apparatus according to an embodiment of the present disclosure.

As illustrated in FIG. 6, the display panel 100 can include an array panel 100a on which pixels P are provided and an image is displayed, and a touch panel 100b on which touch electrodes TE for touch sensing are provided.

The touch panel 100b is, as illustrated in FIG. 6, provided on the array panel 100a and can include touch electrodes TE.

When the touch panel 100b uses a mutual-cap method, some of the touch electrodes TE can be included in touch driving electrodes, and other touch electrodes TE can be included in touch receiving electrodes. That is, the touch panel 100b can include touch driving electrodes and touch receiving electrodes.

In this case, the touch panel 100b can be attached to an upper end of the array panel 100a through an adhesive.

The array panel 100a can include pixels P, data lines DL1 to DLd, and gate lines GL1 to GLg. Each of the pixels P can include a light emitting device ED and a pixel driving circuit PDC. As light is output from the light emitting devices ED, an image can be displayed on the array panel 100a.

For example, the array panel 100a can include a substrate, a pixel driving circuit layer provided on the substrate, a planarization layer covering the pixel driving circuit layer, an anode provided on the planarization layer, a bank covering ends of the anode, a light emitting layer covering the anode and the bank, a cathode covering the light emitting layer, and an encapsulation layer covering the cathode.

The substrate can be any one of a glass substrate, a plastic substrate, and a flexible substrate.

The pixel driving circuit layer can be provided on the substrate. The pixel driving circuit layer can include the transistors Tsw1, Tsw2, and Tdr and the capacitor Cst described with reference to FIG. 2.

That is, the transistors Tsw1, Tsw2, and Tdr and the capacitor Cst described with reference to FIG. 2 can be provide on the substrate.

The planarization layer can perform a function of planarizing an upper end of the pixel driving circuit layer. The planarization layer can be formed of at least one of various types of organic layers, can be formed of at least one of various types of inorganic layers, or can be formed of at least one organic layer and at least one inorganic layer.

The anode can be provided on the planarization layer. The anode can be provided for each pixel P, and the anodes are separated from each other.

The bank covers the ends of the anodes. The bank can be formed of at least one of an organic material and an inorganic material.

Light can be output to the outside through an area of the anode that is not covered by the bank. In the following description, an area of the anode that is not covered by the bank is referred to as an opening portion.

The light emitting layer can be provided on the anode and the bank.

The light emitting layer can be covered by the cathode.

The cathode can be covered by the encapsulation layer. The encapsulation layer can perform a function of protecting the light emitting device ED from oxygen or moisture introduced from the outside.

The encapsulation layer (or filling layer) can be formed of at least one of various types of organic layers, at least one of various types of inorganic layers, or at least one organic layer and at least one inorganic layer.

Next, referring to FIGS. 6 and 7, the touch panel 100b can include touch electrodes TE for touch sensing, a portion of the touch electrodes TE can be the touch driving electrodes TX, and another portion of the touch electrodes TE can be the touch receiving electrodes RX.

For example, the touch panel 100b can include touch driving electrodes TX provided along a first direction (e.g., an X-axis direction) of the touch panel 100b and touch receiving electrodes RX provided along a second direction (e.g., a Y-axis direction) different from the first direction, as illustrated in FIG. 7. In the following description, the first direction is represented by the reference numeral X, and the second direction is represented by the reference numeral Y.

The touch panel 100b can include at least two touch driving electrodes TX and at least two touch receiving electrodes RX. Hereinafter, for convenience of description, a touch panel, as illustrated in FIG. 7, including six touch driving electrodes TX1 to TX6 and four touch receiving electrodes RX1a, RX1b, RX2a, and RX2b will be described as an example of the touch panel 100b applied to a display apparatus according to an embodiment of the present disclosure.

Each of the touch driving electrodes TX can be connected to the touch driver 800 through a touch driving electrode line TXL, and each of the touch receiving electrodes RX can be connected to the touch driver 800 through a touch receiving electrode line RXL.

For example, first to sixth touch driving electrodes TX1 to TX6 can be connected to the touch driver 800 through first to sixth touch driving electrode lines TXL1 to TXL6.

Also, a 1a-th touch receiving electrode RX1a can be connected to the touch driver 800 through a 1a-th touch receiving electrode line RXL1a, a 1b-th touch receiving electrode RX1b can be connected to the touch driver 800 through a 1b-th touch receiving electrode line RXL1b, a 2a-th touch receiving electrode RX2a can be connected to the touch driver 800 through a 2a-th touch receiving electrode line RXL2a, and a 2b-th touch receiving electrode RX2b can be connected to the touch driver 800 through a 2b-th touch receiving electrode line RXL2b.

The touch driving electrodes TX and the touch receiving electrodes RX can be provided on the touch panel 100b in various structures.

For example, each of the touch driving electrodes TX includes touch electrodes TE provided along the first direction X of the touch panel 100b and routing lines STXL provided along the second direction Y to electrically connect the touch electrodes TE provided along the first direction X, as illustrated in FIG. 7.

In the following description, the touch electrode TE configuring the touch driving electrode TX is referred to as a sub-touch driving electrode STX.

For example, in FIG. 7, sub-touch driving electrodes STX configuring the fourth touch driving electrode TX4 are referred to as a 4a-th sub-touch driving electrode STX4a, a 4b-th sub-touch driving electrode STX4b, and a 4c-th sub-touch driving electrode STX4c.

The touch driving electrodes TX are provided to be spaced apart from each other in the second direction Y of the touch panel 100b.

For example, each of the first to sixth touch driving electrodes TX1 to TX6 can extend in the first direction X, as illustrated in FIG. 7, and the first to sixth touch driving electrodes TX1 to TX6 can be spaced apart from each other in the second direction Y.

As illustrated in FIG. 7, the routing line STXL can perform a function of connecting the touch electrodes TE provided along the first direction X.

That is, the routing line STXL can perform a function of electrically connecting the sub-touch driving electrodes STX configuring the touch driving electrode TX.

A touch receiving electrode RX can be provided between two sub-touch driving electrodes STX adjacent to each other and spaced apart from each other, as illustrated in FIG. 7.

Each of the touch receiving electrodes RX can be a touch electrode TE extending along the second direction Y between two touch electrodes TE spaced apart along the first direction X.

That is, the touch electrode TE can be the sub-touch driving electrode STX configuring the touch driving electrode TX or the touch receiving electrode RX.

In this case, the touch receiving electrode RX can be provided between two sub-touch driving electrodes STX spaced apart along the first direction X.

A length of the touch receiving electrode RX in the second direction Y can be greater than a length of the sub-touch driving electrode STX in the second direction Y.

In particular, the length of the touch receiving electrode RX in the second direction Y can be the same as or similar to a length of the sub-touch driving electrodes STX in the second direction Y provided in a vertical row along the second direction Y.

In this case, one touch receiving electrode RX can be provided in the second direction Y.

However, as an area of a display apparatus increases, a length in the second direction Y of the display apparatus can increase, and a length in the second direction Y of the touch panel 100b can increase.

When the length of the touch panel 100b in the second direction Y increases, a length of one touch receiving electrode RX provided along the second direction Y can increase.

When the length of the touch receiving electrode RX in the second direction Y increases, a magnitude and sensitivity of a touch sensing signal generated in the touch receiving electrode RX and transmitted to the touch driver 800 can vary depending on a location where the touch is generated.

To prevent this, at least two touch receiving electrodes RX can be provided in a vertical row along the second direction Y. In this case, each of the at least two touch receiving electrodes RX can be formed to be smaller than a length of the sub-touch driving electrodes STX provided in a vertical row along the second direction Y.

For example, a touch panel in which two touch receiving electrodes RX are arranged in a vertical row along the second direction Y is illustrated in FIG. 7 as an example of a touch panel 100*b* applied to a display apparatus according to an embodiment of the present disclosure.

That is, in FIG. 7, the 1a-th touch receiving electrode RX1*a* and the 1b-th touch receiving electrode RX1*b* are arranged in the vertical row along the second direction Y, and the 2a-th touch receiving electrode RX2*a* and the 2b-th touch receiving electrode RX2*b* are arranged in the vertical row along the second direction Y.

In the following description, an area in which the touch driving electrodes TX and the touch receiving electrodes RX are provided is referred to as a touch area TA, and an area in which the touch driving electrodes TX and the touch receiving electrodes RX are not provided is referred to as a non-touch area NTA.

In this case, the touch area TA can correspond to the display area DA, and the non-touch area NTA can correspond to the non-display area NDA, but is not limited thereto.

Next, each of first routing lines STXL1*a*, STXL1*b*, and STXL1*c* connected to the touch electrodes TE configuring the first touch driving electrode TX1 among the touch driving electrodes TX can extend along the second direction Y.

For example, each of the touch driving electrodes TX can be connected to the touch driver 800 through one touch driving electrode line TXL.

However, as an area of a display apparatus increases, a distance between the touch driving electrode TX and the touch driver 800 can increase, and a length of the touch driving electrode TX can increase.

Accordingly, a magnitude of a touch driving signal can be different for each location of the touch driving electrode TX, and thus the magnitude and sensitivity of the touch sensing signal can vary for each location of the touch driving electrode TX.

To prevent this, in a display apparatus according to an embodiment of the present disclosure, as illustrated in FIG. 7, each of the first routing lines STXL1*a*, STXL1*b*, and STXL1*c* connected to the touch electrodes TE configuring the first touch driving electrode TX1 among the touch driving electrodes TX can extend along the second direction Y.

In this case, the first routing lines STXL1*a*, STXL1*b*, and STXL1*c* can be connected to a first touch driving electrode line TXL1 in the non-touch area NTA, and the first touch driving electrode line TXL1 can be connected to the touch driver 800.

In particular, each of the first routing lines STXL1*a*, STXL1*b*, and STXL1*c* can extend in the second direction Y in the touch area TA, as illustrated in FIG. 7.

Therefore, the first routing lines STXL1*a*, STXL1*b*, and STXL1*c* can be provided in parallel along the first direction X.

That is, each of the routing lines STXL connected to the touch driving electrode TX can extend in the second direction Y, and the routing lines STXL connected to the touch driving electrode TX can be provided side by side along the first direction X.

Moreover, routing lines STXL connected to different touch driving electrodes TX can also be provided parallel to each other along the first direction X.

In this case, the lengths of the routing lines STXL connected to the different touch driving electrodes TX can be different, as illustrated in FIG. 7, but can be formed to be the same.

For example, in FIG. 7, a length of a 1c-th routing line STXL1*c* connected to a 1c-th sub-touch driving electrode STX1*c* provided at the upper right of the touch panel 100 and a length of a 4c-th routing line STXL4*c* connected to a 4c-th sub-touch driving electrode STX4*c* provided at the middle of the right of the touch panel 100 are different.

That is, the 4c-th routing line STXL4*c* extends from the 4c-th sub-touch driving electrode STX4*c* along the second direction.

However, the 4c-th routing line STXL4*c* can further extend in the direction toward the 4c-th sub-touch driving electrode STX4*c*, and in this case, the length of the 4c-th routing line STXL4*c* and the length of the 1c-th routing line STXL1*c* can be the same.

When the lengths of the routing lines STXL become the same, the resistance characteristics of the routing lines STXL can be the same or similar, and accordingly, the characteristics of the touch driving signals supplied to the sub-touch driving electrodes STX can be the same or similar.

Each of the touch receiving electrodes RX can be connected to the touch receiving electrode line RXL extending along the second direction Y.

The touch receiving electrode line RXL can also extend in the second direction Y in the touch area TA.

When at least two touch receiving electrodes RX are provided along the second direction Y, a touch receiving electrode line RXL extending along the second direction Y can be connected to each of the at least two touch receiving electrodes RX.

For example, in the touch panel 100*b* illustrated in FIG. 7, a 1a-th touch receiving electrode RX1*a* and a 1b-th touch receiving electrode RX1*b* are provided in a vertical row along the second direction Y.

In this case, a 1a-th touch receiving electrode line RXL1*a* connected to the 1a-th touch receiving electrode RX1*a* and a 1b-th touch receiving electrode line RXL1*b* connected to the 1b-th touch receiving electrode RX1*b* extend along the second direction Y and can be provided parallel in the first direction X.

A length of the 1a-th touch receiving electrode line RXL1*a* and a length of the 1b-th touch receiving electrode line RXL1*b* can be different from each other. However, as described above, the length of the 1a-th touch receiving electrode line RXL1*a* and the length of the 1b-th touch receiving electrode line RXL1*b* can be the same as each other so that the resistance characteristics of the 1a-th touch receiving electrode line RXL1*a* and the resistance characteristics of the 1b-th touch receiving electrode line RXL1*b* can be the same or similar.

That is, the 1b-th touch receiving electrode line RXL1*b* can extend to overlap the 1a-th touch receiving electrode RX1*a*.

Finally, as illustrated in FIG. 8, the touch driving electrode lines TXL can be connected to side pads 802 exposed to the side surface of the touch panel 100*b*, and the side pads 802 can be electrically connected to a printed circuit board 810 on which the touch driver 800 is mounted.

To this end, each of the touch driving electrode lines TXL and touch receiving electrode lines RXL connected to the touch electrodes TE provided in the touch panel 100b can extend in a side direction of the touch panel 100b and can be connected to the side pad 802 exposed to the side surface of the touch panel 100b.

As the printed circuit board 810 on which the touch driver 800 is mounted is electrically connected to the side pad 802 exposed to the side surface of the touch panel 100b, the connection process between the touch driver 800 and the printed circuit board 810 can be performed more easily.

In this case, in order to minimize or at least reduce the area or length of the printed circuit board 810 and simplify the connection between the printed circuit board 810 and the side pad 802, the touch driving electrode lines TXL and the touch receiving electrode lines RXL can be formed on one side of the side surface of the touch panel 100b.

For example, in the touch panel 100b illustrated in FIG. 8, the side pads 802 are concentrated in the left direction of the side surface of the touch panel 100b.

However, the touch electrodes TE can be electrically connected to the printed circuit board 810 through pads 801 exposed on the upper or lower surface of the touch panel 100b.

For example, as illustrated in FIG. 7, the touch driving electrode lines TXL and touch receiving electrode lines RXL connected to the touch electrodes TE can be electrically connected to pads 801 exposed on the upper or lower surface of the touch panel 100b, and the printed circuit board on which the touch driver 800 is mounted can be connected to the pads 801 exposed on the upper or lower surface of the touch panel 100b.

Figure 9:
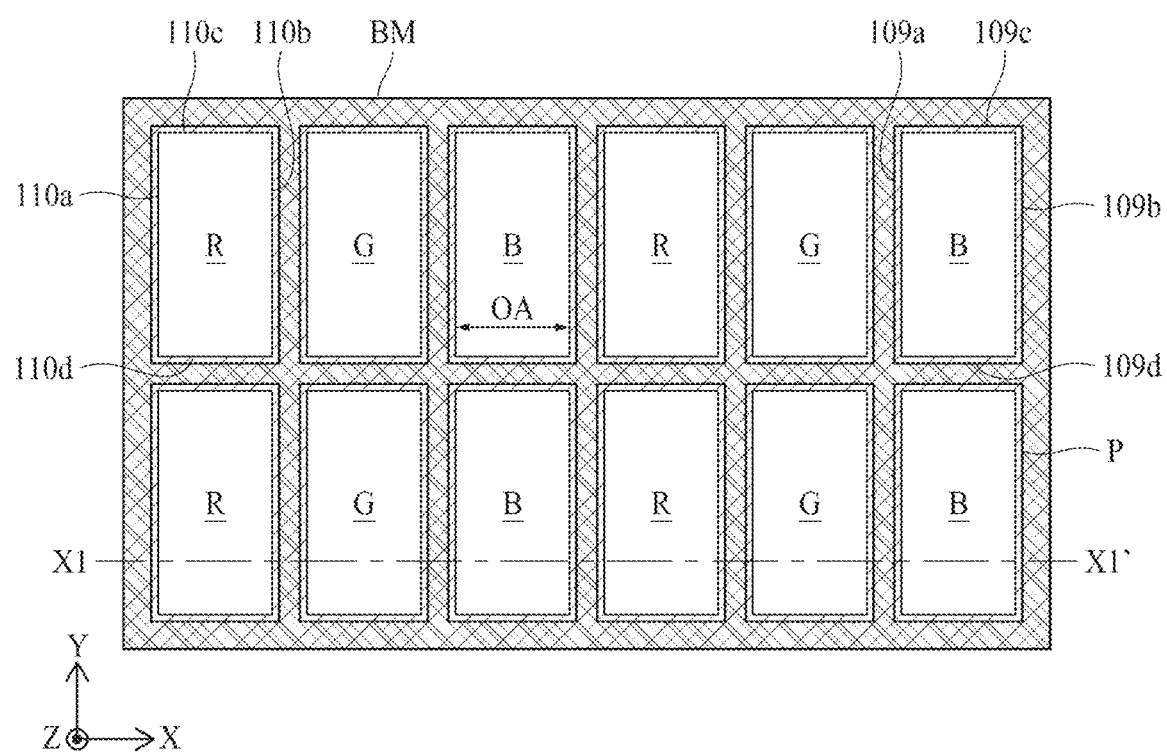
FIG. 9 is a plan view illustrating pixels provided in a first area or a second area illustrated in FIG. 7 according to an embodiment of the present disclosure.
Figure 10:
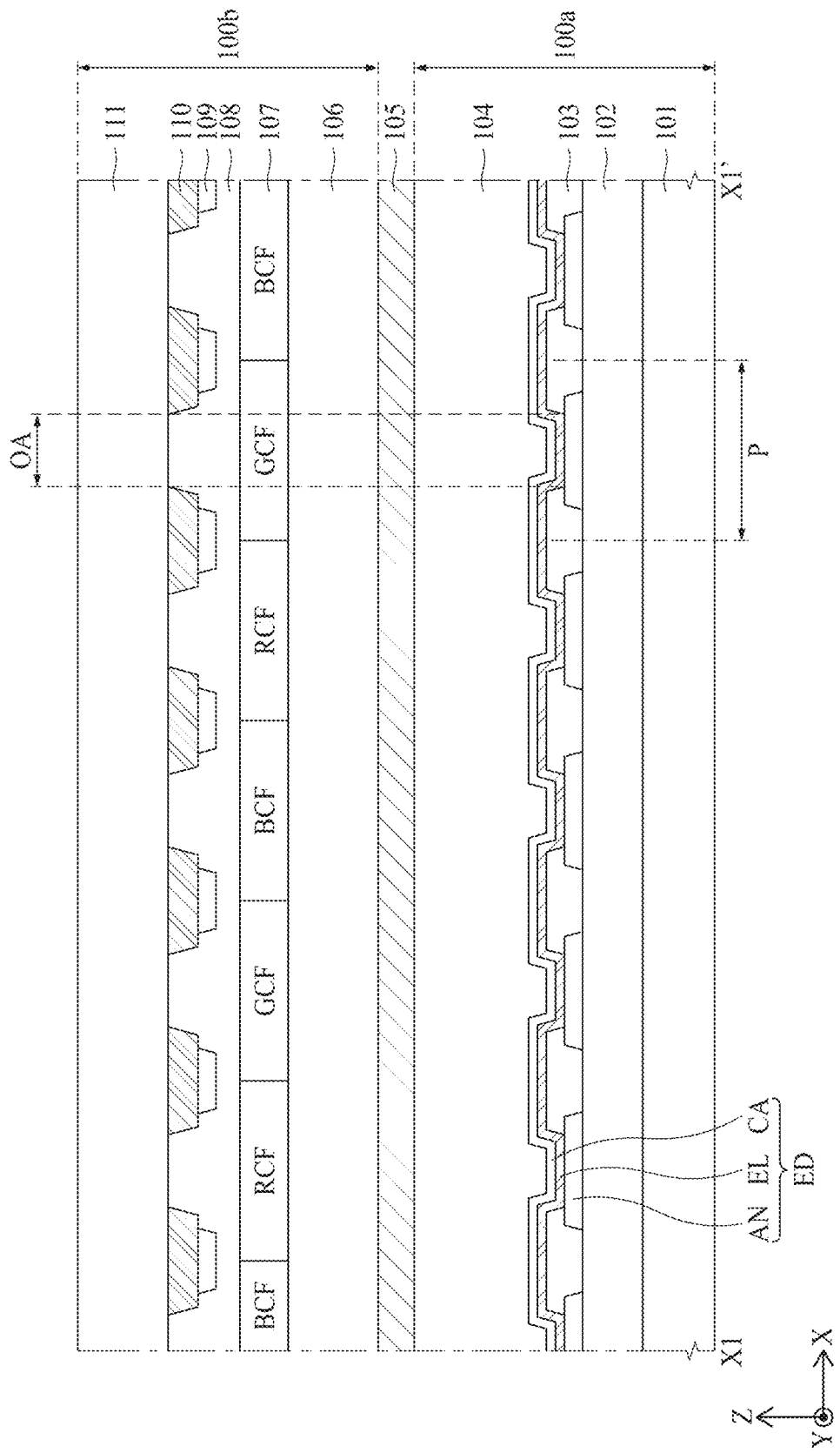
FIG. 10 is an exemplary diagram illustrating a cross-sectional surface taken along line X1-X1' illustrated in FIG. 9 according to an embodiment of the present disclosure.
Figure 11:
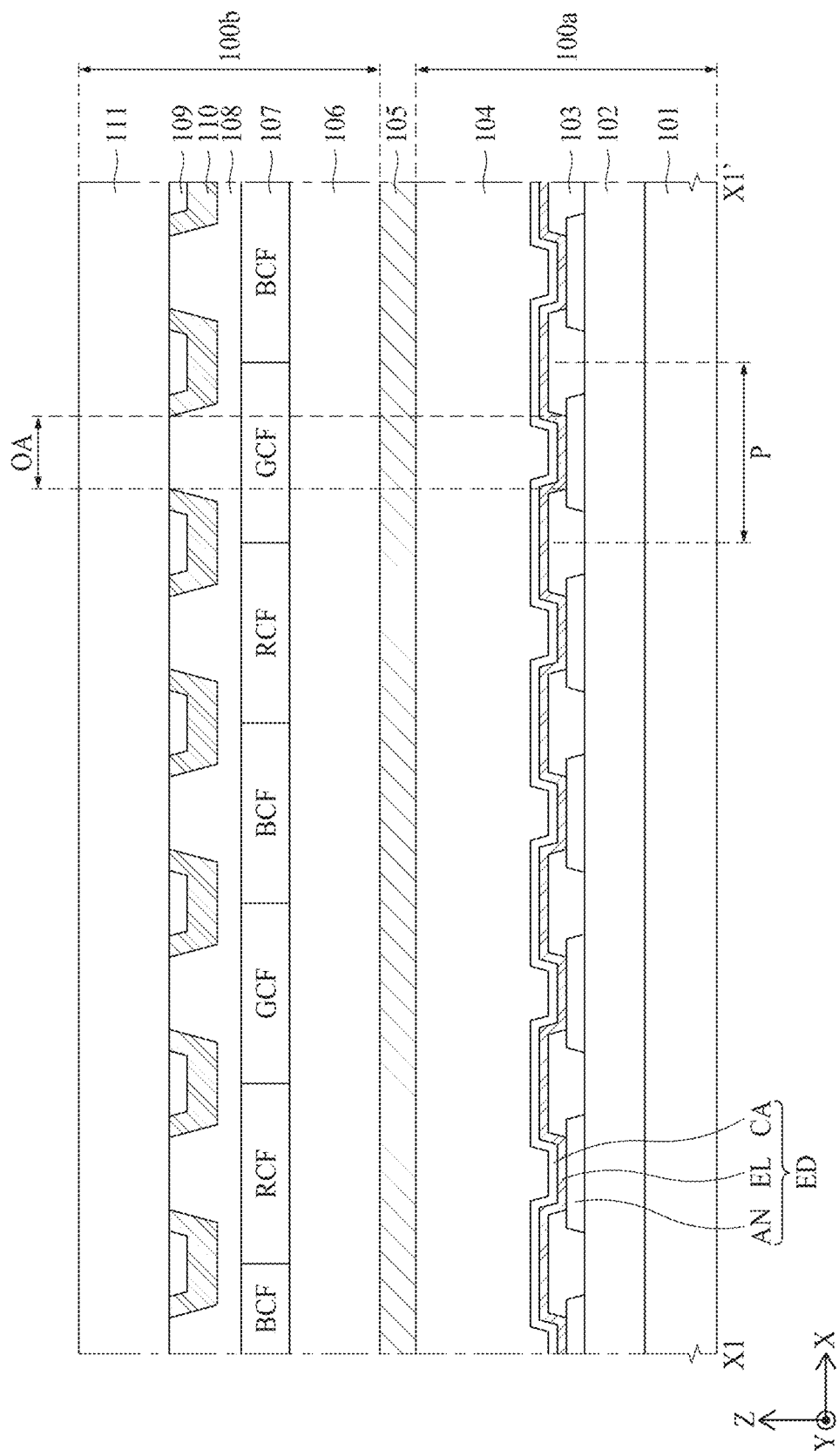
FIG. 11 is another exemplary diagram illustrating a cross-sectional surface taken along line X1-X1' illustrated in FIG. 9 according to an embodiment of the present disclosure.

FIG. 9 is a plan view illustrating pixels provided in a first area or a second area illustrated in FIG. 7 according to one embodiment, FIG. 10 is an exemplary diagram illustrating a cross-sectional surface taken along line X1-X1' illustrated in FIG. 9 according to one embodiment, and FIG. 11 is another exemplary diagram illustrating a cross-sectional surface taken along line X1-X1' illustrated in FIG. 9 according to one embodiment.

As described above, the display panel 100 applied to a display apparatus according to an embodiment of the present disclosure includes the array panel 100a and the touch panel 100b.

Pixels P having the opening portions OA through which light is output are provided in the array panel 100a.

As illustrated in FIG. 9, the pixels P can include a red pixel R that outputs red light, a green pixel G that outputs green light, and a blue pixel B that outputs blue light, but are not limited thereto.

However, hereinafter, for convenience of description, an array panel including red pixels R, green pixels G, and blue pixels B, as illustrated in FIGS. 9 and 10, is described as an example of the array panel 100a applied to a display apparatus according to an embodiment of the present disclosure.

As described above, the array panel 100a can include the substrate, the pixel driving circuit layer, the planarization layer, the anode, the bank, the light emitting layer, the cathode, and the encapsulation layer.

For example, the array panel 100a can include a pixel driving layer 102 provided on the substrate 101, and the pixel driving layer 102 can include the pixel driving circuit layer and the planarization layer.

Anodes AN can be provided on the pixel driving layer 102, the bank 103 is provided outside the anodes AN, and each of areas not covered by the bank 103 in the anodes AN can be the opening portion OA.

The anode AN is covered by the light emitting layer EL, and the light emitting layer EL is covered by the cathode CA. The anode AN, the light emitting layer EL, and the cathode CA form the light emitting device ED.

Light emitting devices ED can be covered by the encapsulation layer 104.

As illustrated in FIGS. 9 to 11, the touch panel 100b can be bonded to the array panel 100a by using an adhesive 105.

The touch panel 100b includes a black matrix BM including black matrix lines 110 surrounding an area corresponding to the opening portion OA, black matrix electrodes 109 overlapping the black matrix lines 110, an insulation layer 108 covering the black matrix lines 110 and the black matrix electrodes 109, color filters 107 provided at a lower end of the insulation layer 108 and facing the array panel 100a, and an overcoating layer 106 covering the color filters 107. The black matrix lines 110 are provided at a lower end of an encapsulation substrate 111.

In the above description, the components of the touch panel 100b are described based on the encapsulation substrate 111. The components of the touch panel 100b are listed based on the color filters 107 adjacent to the array panel 100a as follows.

For example, the touch panel 100b can include the color filters 107 disposed to overlap the pixels P, the insulation layer 108 disposed on the color filters 107, the black matrix BM including the black matrix lines 110 disposed on the insulation layer 108 and surrounding areas corresponding to the opening portions OA, the black matrix electrodes 109 overlapping black matrix lines 110, and the encapsulation substrate 111 disposed on the black matrix BM.

The array panel 100a and the touch panel 100b can be bonded by the adhesive 105 applied to the lower surface of the overcoating layer 106 and the upper surface of the encapsulation layer 104.

First, the encapsulation substrate 111 can be a glass substrate, but can be a substrate formed of various types of synthetic resin.

Next, the black matrix BM includes black matrix lines 110 surrounding an area corresponding to the opening portion OA, and the black matrix electrodes 109 overlap the black matrix lines 110.

The black matrix line 110 means a portion of the black matrix BM, and for example, as illustrated in FIG. 9, the black matrix line 110 can be any one of an area of the black matrix BM provided at an upper end of the pixel P, an area of the black matrix BM provided at a lower end of the pixel P, an area of the black matrix BM provided at a left side of the pixel P, and an area of the black matrix BM provided at a right side of the pixel P.

Hereinafter, for convenience of description, the area provided on the left side of the pixel P in the black matrix BM is referred to as a left black matrix line 110a, the area provided on the right side of the pixel P in the black matrix BM is referred to as a right black matrix line 110b, the area provided on the upper end of the pixel P in the black matrix BM is referred to as an upper black matrix line 110c, and the area provided on the lower end of the pixel P in the black matrix BM is referred to as a lower black matrix line 110d.

That is, the black matrix BM includes the left black matrix lines 110a, the right black matrix lines 110b, the upper black matrix lines 110c, and the lower black matrix lines 110d.

In this case, the black matrix line 110 provided between two pixels P adjacent along the first direction X can be the right black matrix line 110b with respect to a pixel P provided on the left, and can be the left black matrix line 110a with respect to a pixel P provided on the right.

Therefore, one black matrix line 110 can be the left black matrix line 110a or the right black matrix line 110b, depending on a pixel P as a reference.

Moreover, the black matrix line 110 provided between two pixels P adjacent along the second direction Y can be the upper black matrix line 110c or the lower black matrix line 110d, depending on a pixel P as reference.

In the following description, when the left black matrix line 110a, the right black matrix line 110b, the upper black matrix line 110c, and the lower black matrix line 110d do not need to be distinguished, a display apparatus according to an embodiment of the present disclosure is described using the black matrix line 110.

The black matrix electrode 109 overlaps the black matrix line 110.

In the following description, when the black matrix lines 110 are divided into the left black matrix line 110a, the right black matrix line 110b, the upper black matrix line 110c, and the lower black matrix line 110d, the black matrix electrodes 109 can also be divided into a left black matrix electrode 109a, a right black matrix electrode 109b, an upper black matrix electrode 109c, and a lower black matrix electrode 109d.

However, when the left black matrix electrode 109a, the right black matrix electrode 109b, the upper black matrix electrode 109c, and the lower black matrix electrode 109d do not need to be distinguished, a display apparatus according to an embodiment of this specification is described using the black matrix electrode 109.

Each of the touch electrodes TE includes at least two black matrix electrodes 109 connected to each other.

For example, when the touch electrode TE is the sub-touch driving electrode STX, the sub-touch driving electrode STX includes at least two black matrix electrodes 109 connected to each other, and when the touch electrode TE is the touch receiving electrode RX, the touch receiving electrode RX includes at least two black matrix electrodes 109 connected to each other.

For example, a first area AR1 illustrated in FIG. 7 is an area in which the touch electrode TE is provided, and particularly, an area in which the sub-touch driving electrode STX is provided. In particular, the routing line STXL and the touch driving electrode line TXL are not provided in the first area AR1 illustrated in FIG. 7, and only the sub-touch driving electrode STX is provided.

Therefore, as illustrated in FIG. 9, the left black matrix electrodes 109a, the right black matrix electrodes 109b, the upper black matrix electrodes 109c, and the lower black matrix electrodes 109d are connected to each other to form one sub-touch driving electrode STX.

In particular, the left black matrix electrodes 109a, the right black matrix electrodes 109b, the upper black matrix electrodes 109c, and the lower black matrix electrodes 109d illustrated in FIG. 9 can form a 1a-th sub-touch driving electrode STX1a illustrated in FIG. 7.

That is, the 1a-th sub-touch driving electrode STX1a can include at least two black matrix electrodes 109a, 109b, 109c, and 109d.

Also, when the plan view illustrated in FIG. 9 is not the first area AR1 but a second area AR2 in which only the touch receiving electrode RX is provided in FIG. 7, the left black matrix electrodes 109a, the right black matrix electrodes 109b, the upper black matrix electrodes 109c, and the lower black matrix electrodes 109d illustrated in FIG. 9 can form the touch receiving electrode RX, especially the 1a-th touch receiving electrode RX1a.

That is, the touch receiving electrode RX can include at least two black matrix electrodes 109a, 109b, 109c, and 109d.

Finally, the black matrix lines 110 can be provided at the lower end of the encapsulation substrate 111 to surround areas corresponding to the opening portions OA, and the black matrix electrodes 109 can overlap the black matrix lines 110.

For example, as illustrated in FIG. 10, the black matrix lines 110 can be provided on a lower surface of the encapsulation substrate 111, and the black matrix electrodes 109 can be provided at a lower end of the black matrix lines 110.

That is, the black matrix electrodes 109 can be provided between the black matrix lines 110 and the insulation layer 108.

In this case, the black matrix electrode 109 can be provided on a lower surface of the black matrix line 110, and a width (a length in the X-axis direction) of the black matrix electrode 109 can be smaller than a width (a length in the X-axis direction) of the black matrix line 110.

However, as illustrated in FIG. 11, the black matrix electrodes 109 can be provided on the lower surface of the encapsulation substrate 111 and can be covered by the black matrix lines 110.

For example, the black matrix electrodes 109 can be provided between the encapsulation substrate 111 and the black matrix lines 110.

In this case, the black matrix line 110 can be provided to surround a lower surface and side surfaces of the black matrix electrode 109.

Therefore, the width (a length in the X-axis direction) of the black matrix electrode 109 can be smaller than the width (a length in the X-axis direction) of the black matrix line 110.

Hereinafter, the structure of the touch panel 100b will be described using plan views and cross-sectional views of the touch panel 100b in various areas of the touch panel 100b.

Figure 12:
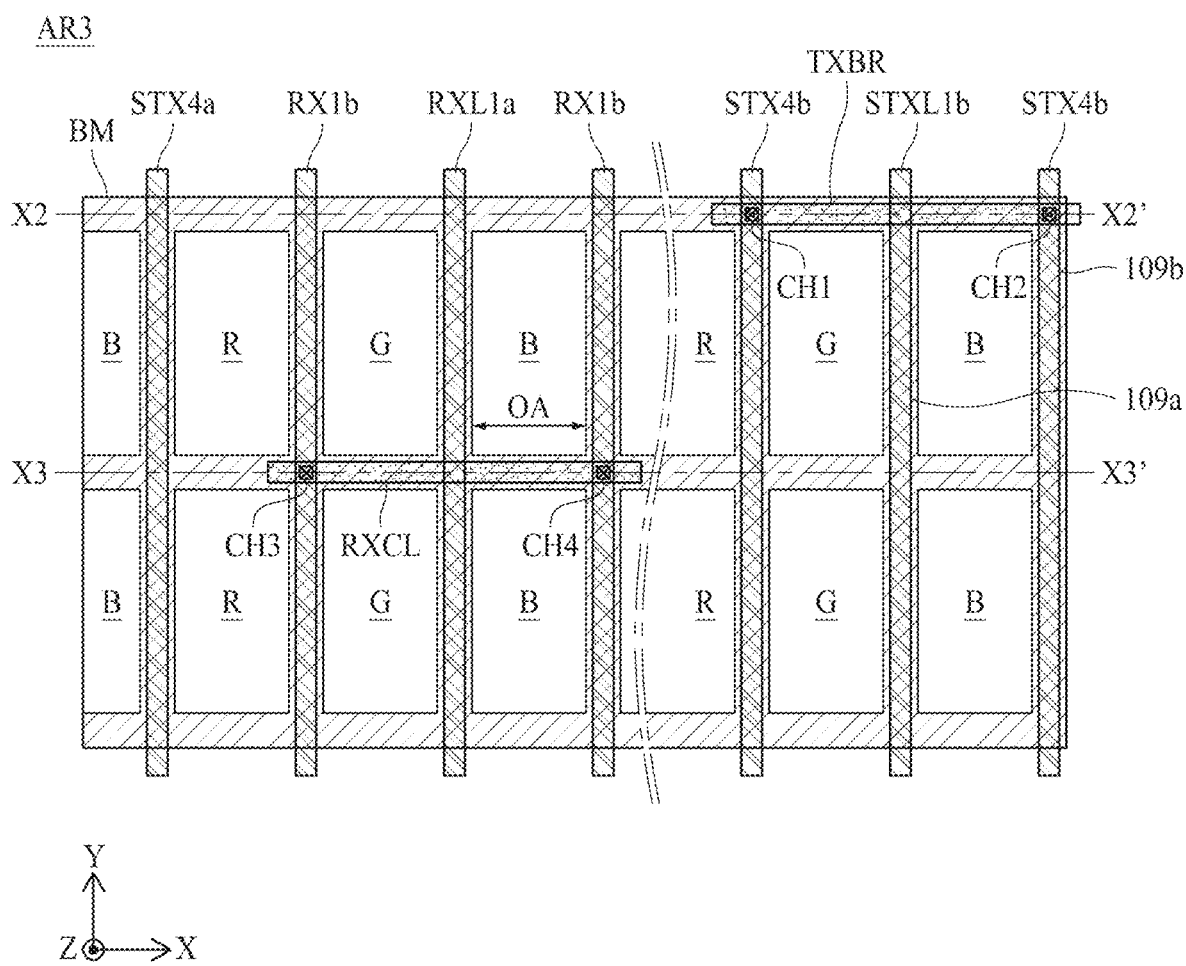
FIG. 12 is a plan view of a third area of a touch panel illustrated in FIG. 7 according to an embodiment of the present disclosure.
Figure 13:
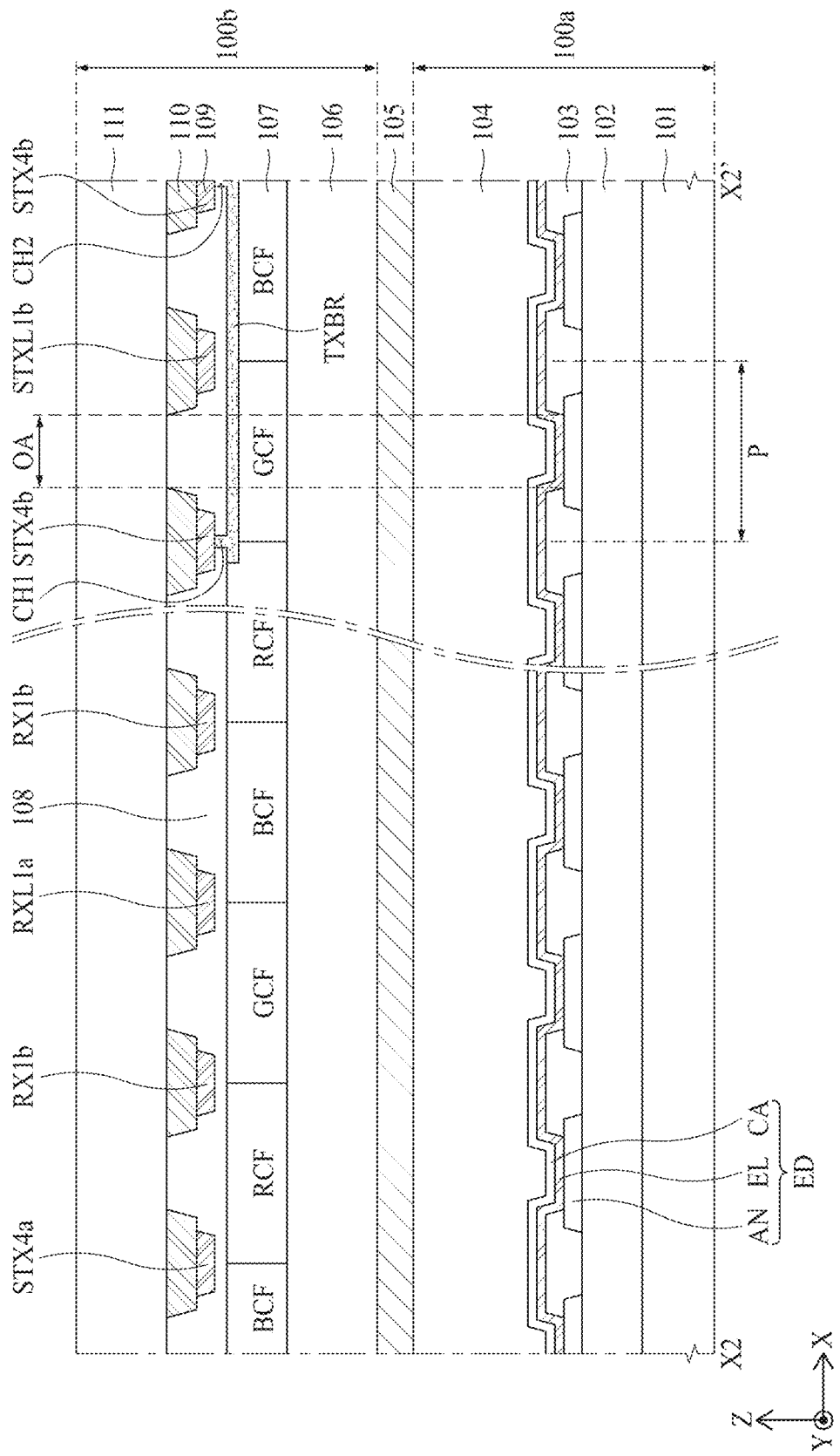
FIG. 13 is an exemplary diagram illustrating a cross-sectional surface taken along line X2-X2' illustrated in FIG. 12 according to an embodiment of the present disclosure.
Figure 14:
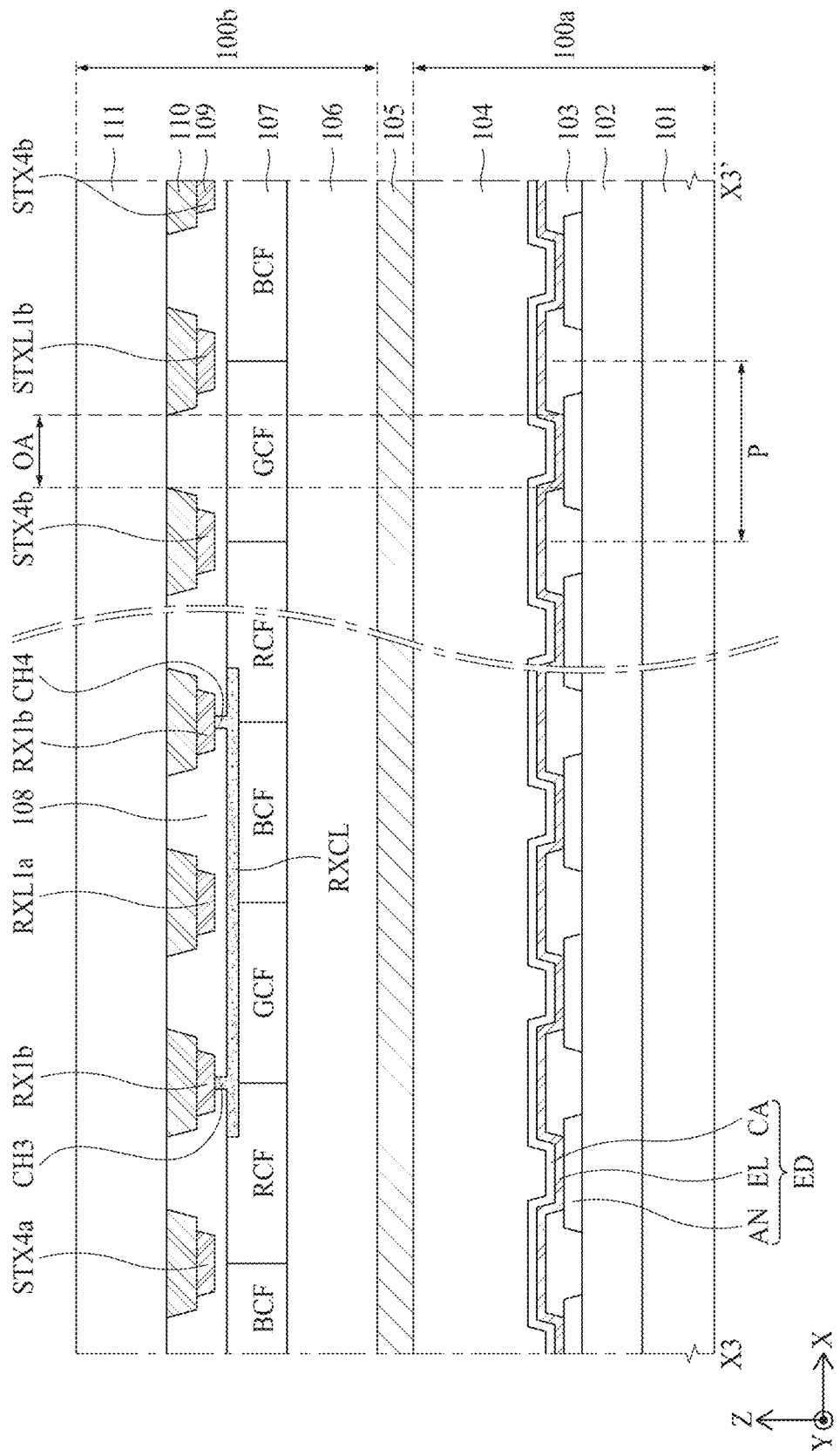
FIG. 14 is an exemplary diagram illustrating a cross-sectional surface taken along line X3-X3' illustrated in FIG. 12 according to an embodiment of the present disclosure.

FIG. 12 is a plan view of a third area of a touch panel illustrated in FIG. 7 according to one embodiment, FIG. 13 is an exemplary diagram illustrating a cross-sectional surface taken along line X2-X2' illustrated in FIG. 12 according to one embodiment, and FIG. 14 is an exemplary diagram illustrating a cross-sectional surface taken along line X3-X3' illustrated in FIG. 12 according to one embodiment.

As described above, the touch panel 100b includes the black matrix BM including the black matrix lines 110 that are provided at the lower end of the encapsulation substrate 111 and surround areas corresponding to the opening portions OA, the black matrix electrodes 109 overlapping the black matrix lines 110, the insulation layer 108 covering the black matrix lines 110 and the black matrix electrodes 109, and the color filters RCF, GCF, and BCF that are provided at the lower end of the insulation layer 108 and face the array panel 100a.

First, referring to FIGS. 12 and 13, the black matrix electrodes 109 can overlap the black matrix lines 110. For example, as illustrated in FIG. 13, the black matrix lines 110 can be provided on a lower surface of the encapsulation substrate 111, and the black matrix electrodes 109 can be provided at a lower end of the black matrix lines 110.

In this case, for example, a 4a-th sub-touch driving electrode STX4a and a 4b-th sub-touch driving electrode STX4b configuring the fourth touch driving electrode TX4 are spaced apart from each other, as illustrated in FIGS. 7 and 12.

In particular, a 1b-th touch receiving electrode RX1b is provided between the 4a-th sub-touch driving electrode STX4a and the 4b-th sub-touch driving electrode STX4b.

As illustrated in FIG. 7, a 1a-th touch receiving electrode line RXL1a can be provided in an area of the third area AR3, which overlaps the 1b-th touch receiving electrode RX1b, and a 1b-th routing line STXL1b can be provided in an area of the third area AR3, which overlaps the 4b-th sub-touch driving electrode STX4b.

In this case, the 4a-th sub-touch driving electrode STX4a is connected to a 4a-th routing line, and the 4b-th sub-touch driving electrode STX4b is connected to a 4b-th routing line. As the 4a-th routing line and the 4b-th routing line are connected, the 4a-th sub-touch driving electrode STX4a and the 4b-th sub-touch driving electrode STX4b can be electrically connected.

Also, a touch driving bridge TXBR can be used to electrically connect two black matrix electrodes that form the 4b-th sub-touch driving electrode STX4b and are spaced apart from each other with the 1b-th routing line STXL1b therebetween.

For example, the touch driving bridge TXBR can be provided at a lower end of the insulation layer 108 covering the black matrix line 110 and the black matrix electrode 109.

In this case, the touch driving bridge TXBR can connect two black matrix electrodes, which are spaced apart from each other along the first direction X, through contact holes formed in the insulation layer 108.

To be more specific, a black matrix electrode 109 connected to the touch driving bridge TXBR through a first contact hole CH1 and a black matrix electrode 109 connected to the touch driving bridge TXBR through a second contact hole CH2 form the 4b-th sub-touch driving electrode STX4b.

Accordingly, the touch driving bridge TXBR can be connected to the 4b-th sub-touch driving electrode STX4b through the first contact hole CH1 and the second contact hole CH2. Accordingly, the black matrix electrodes, which are spaced apart from each other and form the 4b-th sub-touch driving electrode STX4b, can be electrically connected by the touch driving bridge TXBR.

To provide an additional description, in the third area AR3, as illustrated in FIG. 13, a black matrix electrode 109 configuring the 4a-th sub-touch driving electrode STX4a, a black matrix electrode 109 configuring the 1b-th touch receiving electrode RX1b, a black matrix electrode 109 configuring the 1a-th touch receiving electrode line RXL1a, a black matrix electrode 109 configuring the 1b-th touch receiving electrode RX1b, a black matrix electrode 109 configuring the 4b-th sub-touch driving electrode STX4b, and a black matrix electrode 109 configuring the 1b-th routing line STXL1b are provided side by side along the first direction X, and each of the black matrix electrodes 109 as described above extends along the second direction Y.

In this case, the touch driving bridge TXBR can be provided at the lower end of the black matrix line 110 along the first direction X to electrically connect the black matrix electrodes 109 that are spaced apart from each other along the first direction X and configure the 4b-th sub-touch driving electrode STX4b.

Therefore, the touch driving bridge TXBR electrically connecting the black matrix electrodes 109 configuring the 4b-th sub-touch driving electrode STX4b can overlap the black matrix electrode 109 configuring the 1b-th routing line STXL1b, as illustrated in FIG. 13.

To provide an additional description, the touch driving bridge TXBR can intersect at least one routing line STXL.

In this case, each of the first routing lines STXL1a, STXL1b, and STXL1c, for example, the 1b-th routing line STXL1b can include black matrix electrodes 109 provided in a vertical row in the second direction Y and connected to each other among the black matrix electrodes 109.

That is, each of the routing lines STXL can include black matrix electrodes 109 provided in a vertical row in the second direction Y and connected to each other.

Also, each of the touch receiving electrode lines RXL1 can also include black matrix electrodes 109 provided in a vertical row in the second direction Y and connected to each other.

Moreover, each of second sub-touch driving electrodes configuring the second touch driving electrode TX2 among the touch driving electrodes TX can include black matrix electrodes 109.

In this case, each of the first routing lines STXL1a, STXL1b, and STXL1c can be provided parallel to black matrix electrodes 109, which are provided in a vertical row in the second direction Y in a second sub-touch driving electrode configuring the second touch driving electrode TX2 and are connected to each other.

That is, as described above, each of the first routing lines STXL1a, STXL1b, and STXL1c connected to the first touch driving electrode TX1 can be provided in parallel with black matrix electrodes 109 configuring the second touch driving electrode TX2, black matrix electrodes 109 configuring the third touch driving electrode TX3, black matrix electrodes 109 configuring the fourth touch driving electrode TX4, black matrix electrodes 109 configuring the fifth touch driving electrode TX5, and black matrix electrodes 109 configuring the sixth touch driving electrode TX6.

Second, referring to FIGS. 12 and 14, the black matrix electrodes 109 can overlap the black matrix lines 110.

In this case, for example, the black matrix electrodes 109 configuring the 1b-th touch receiving electrode RX1b can be spaced apart from each other, as illustrated in FIGS. 7 and 12.

In particular, the 1a-th touch receiving electrode line RXL1a can be provided between black matrix electrodes 109 configuring the 1b-th touch receiving electrode RX1b, as illustrated in FIGS. 12 and 14.

In this case, a touch receiving bridge RXCL can be used to electrically connect the black matrix electrodes 109 configuring the 1b-th touch receiving electrode RX1b, as illustrated in FIGS. 12 and 14.

For example, each of the touch receiving bridges RXCL configuring the 1b-th touch receiving electrode RX1b can be provided at a lower end of the insulation layer 108 covering the black matrix line 110 and the black matrix electrode 109.

Each of the touch receiving bridges RXCL can connect at least two black matrix electrodes 109 spaced apart from each other along the first direction X through contact holes formed in the insulation layer 108.

More specifically, the touch receiving bridge RXCL for electrically connecting the black matrix electrodes 109 configuring the 1b-th touch receiving electrode RX1b can be provided at the lower end of the insulation layer 108 covering the black matrix line 110 and the black matrix electrode 109, as illustrated in FIG. 14.

In this case, the touch receiving bridge RXCL can connect the black matrix electrodes 109 which configure the 1b-th touch receiving electrode RX1b and are spaced apart from each other along the first direction X. To this end, the touch receiving bridge RXCL can be connected to the black matrix electrode 109 through a third contact hole CH3 formed in the insulation layer 108, and can be connected to another black matrix electrode 109 through a fourth contact hole CH4 formed in the insulation layer 108.

At least two black matrix electrodes 109 connected by the touch receiving bridge RXCL can be included in the 1b-th touch receiving electrode RX1b as described above.

That is, among the black matrix electrodes 109 forming the touch receiving electrode RX, the black matrix electrodes 109 spaced apart from each other can be electrically connected by the touch receiving bridge RXCL.

Also, among the black matrix electrodes 109 forming the sub-touch driving electrode SXT, the black matrix electrodes 109 spaced apart from each other can be electrically connected by the touch driving bridge TXBR.

In this case, at least one of the touch driving bridge TXBR and the touch receiving bridge RXCL can be formed on a different layer from the black matrix electrodes 109.

To provide an additional description, in the third area AR3, as illustrated in FIG. 14, a black matrix electrode 109 configuring the 4a-th sub-touch driving electrode STX4a, a black matrix electrode 109 configuring the 1b-th touch receiving electrode RX1b, a black matrix electrode 109 configuring the 1a-th touch receiving electrode line RXL1a, a black matrix electrode 109 configuring the 1b-th touch receiving electrode RX1b, a black matrix electrode 109 configuring the 4b-th sub-touch driving electrode STX4b, and a black matrix electrode 109 configuring the 1b-th routing line STXL1b are provided in parallel with each other along the first direction X, and each of the black matrix electrodes 109 as described above extends along the second direction Y.

In this case, the touch receiving bridge RXCL can be provided along the first direction X to electrically connect at least two black matrix electrodes 109 that are spaced apart from each other along the first direction X and configure the 1b-th touch receiving electrode RX1b.

Therefore, the touch receiving bridge RXCL that electrically connects at least two black matrix electrodes 109, which are spaced apart from each other along the first direction X and configure the 1b-th touch receiving electrode RX1b, can overlap the black matrix electrode 109 that forms the 1a-th touch receiving electrode line RXL1a, as illustrated in FIG. 14.

To provide an additional description, each of the touch receiving bridges RXCL can intersect at least one touch receiving electrode line RXL.

That is, a touch receiving electrode line RXL can be provided between two black matrix electrodes 109 provided parallel to each other along the first direction X among the black matrix electrodes 109 configuring the touch receiving electrode RX, and two black matrix electrodes 109 provided parallel to each other can be electrically connected by the touch receiving bridge RXCL provided at the lower end of the insulation layer 108.

Moreover, among the black matrix electrodes 109 configuring the sub-touch driving electrode STX, two black matrix electrodes 109 provided parallel to each other and spaced apart from each other along the first direction X can be connected by the touch driving bridge.

That is, at least one routing line STXL can be provided between two black matrix electrodes 109 provided parallel to each other in the first direction X among the black matrix electrodes 109 configuring the sub-touch driving electrode STX.

In this case, the touch driving bridge TXBR can be provided at the lower end of the insulation layer 108 to intersect at least one routing line STXL, and can be connected to the two black matrix electrodes 109 through a contact hole provided in the insulation layer 108.

As described above, each of the touch receiving bridge RXCL and the touch driving bridge TXBR can be provided between the insulation layer 108 and the color filter 107. However, each of the touch receiving bridge RXCL and the touch driving bridge TXBR can be provided between the color filter 107 and the overcoating layer 106, or can be provided between the black matrix BM and the encapsulation substrate 111.

Each of the touch receiving electrodes RX can include black matrix electrodes provided in a vertical row along the second direction Y and connected among the black matrix electrodes 109.

That is, in an area where the touch receiving electrode RX overlaps the touch receiving bridge RXCL, each of the touch receiving electrodes RX can include black matrix electrodes provided in a vertical row along the second direction Y and connected.

To provide an additional description, the touch receiving electrode RX can include black matrix electrodes 109 provided in a vertical row along the second direction Y and connected.

Also, the touch receiving electrode line RXL can include black matrix electrodes 109 provided in a vertical row along the second direction Y and connected.

Figure 15:
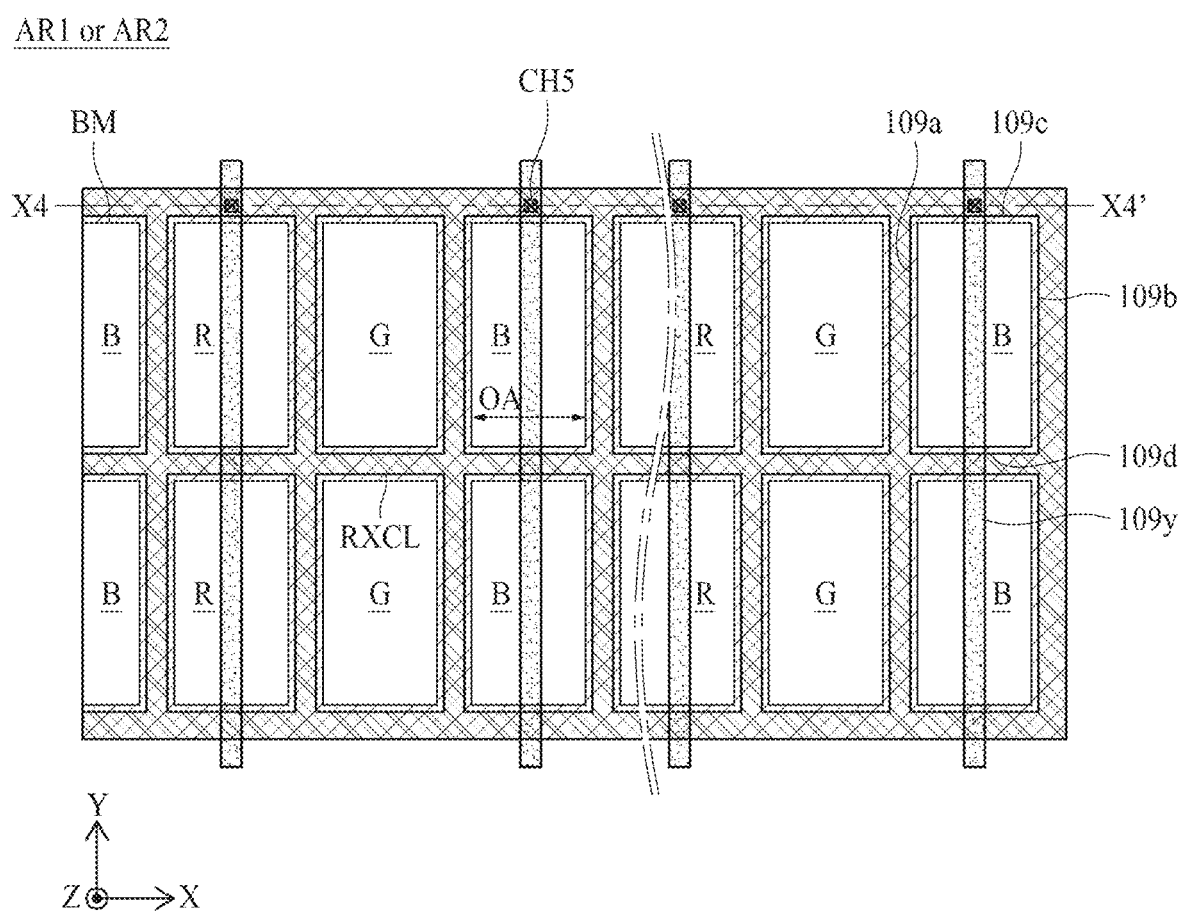
FIG. 15 is another plan view of a first area or a second area illustrated in FIG. 7 according to an embodiment of the present disclosure.
Figure 16:
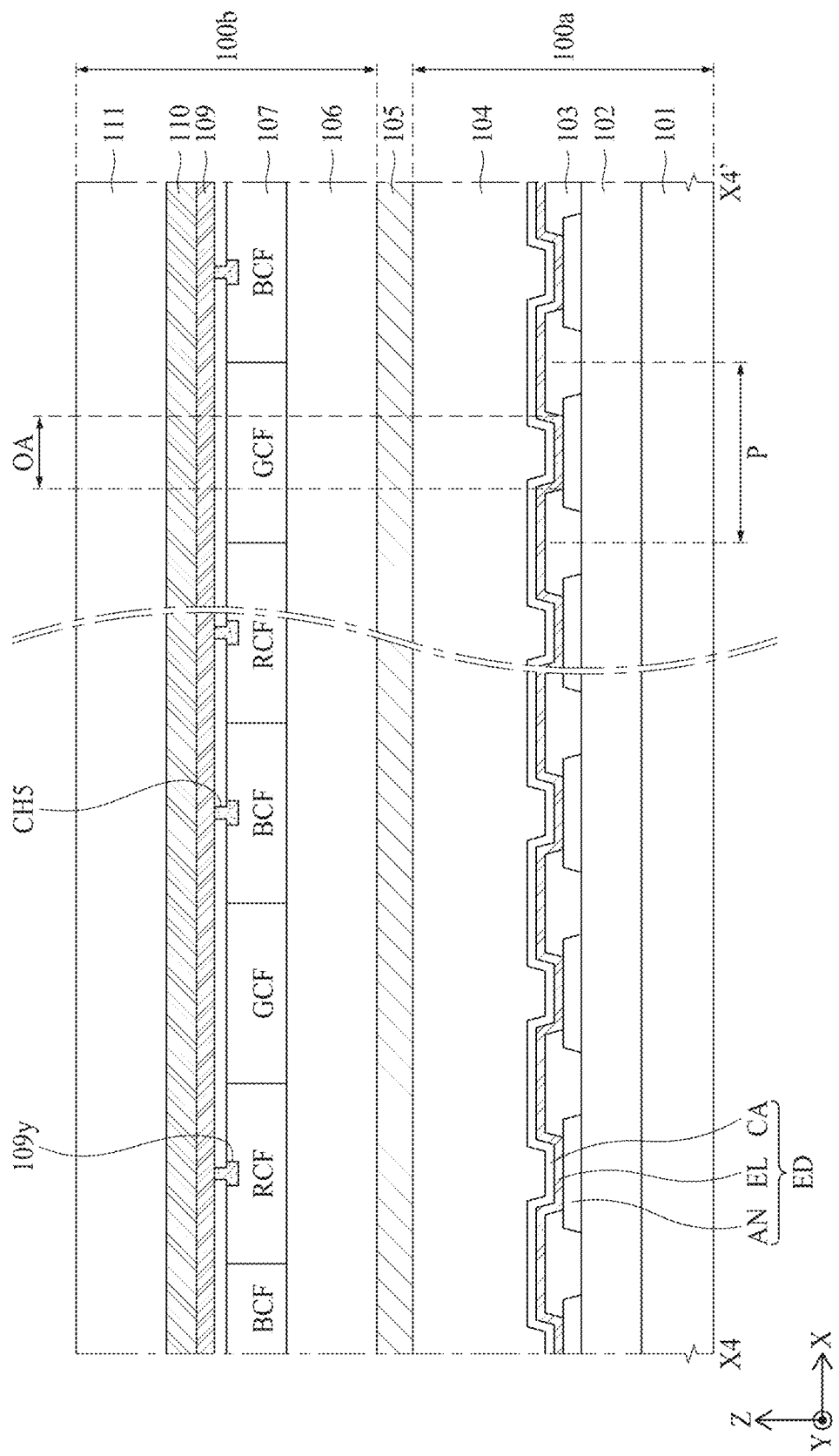
FIG. 16 is an exemplary diagram illustrating a cross-sectional surface taken along line X4-X4' illustrated in FIG. 15 according to an embodiment of the present disclosure.
Figure 17:
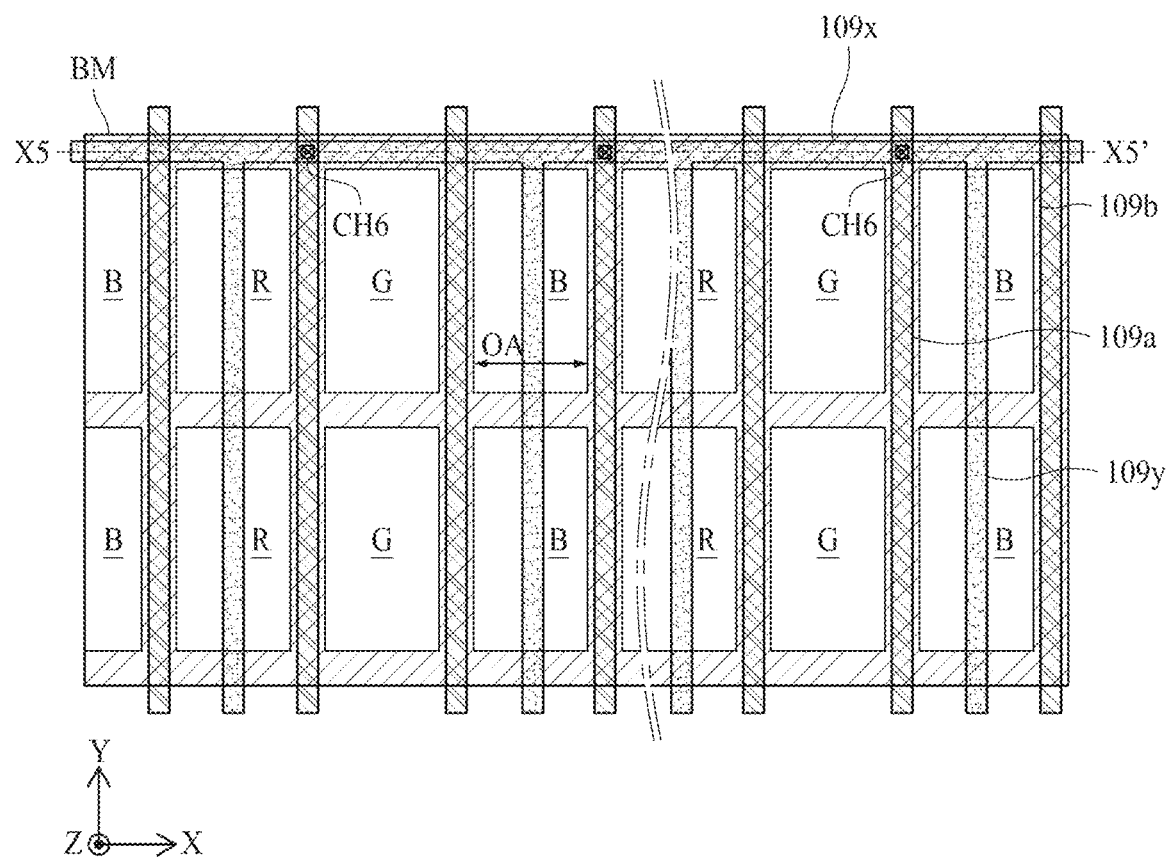
FIG. 17 is another plan view of a first area or a second area illustrated in FIG. 7.
Figure 18:
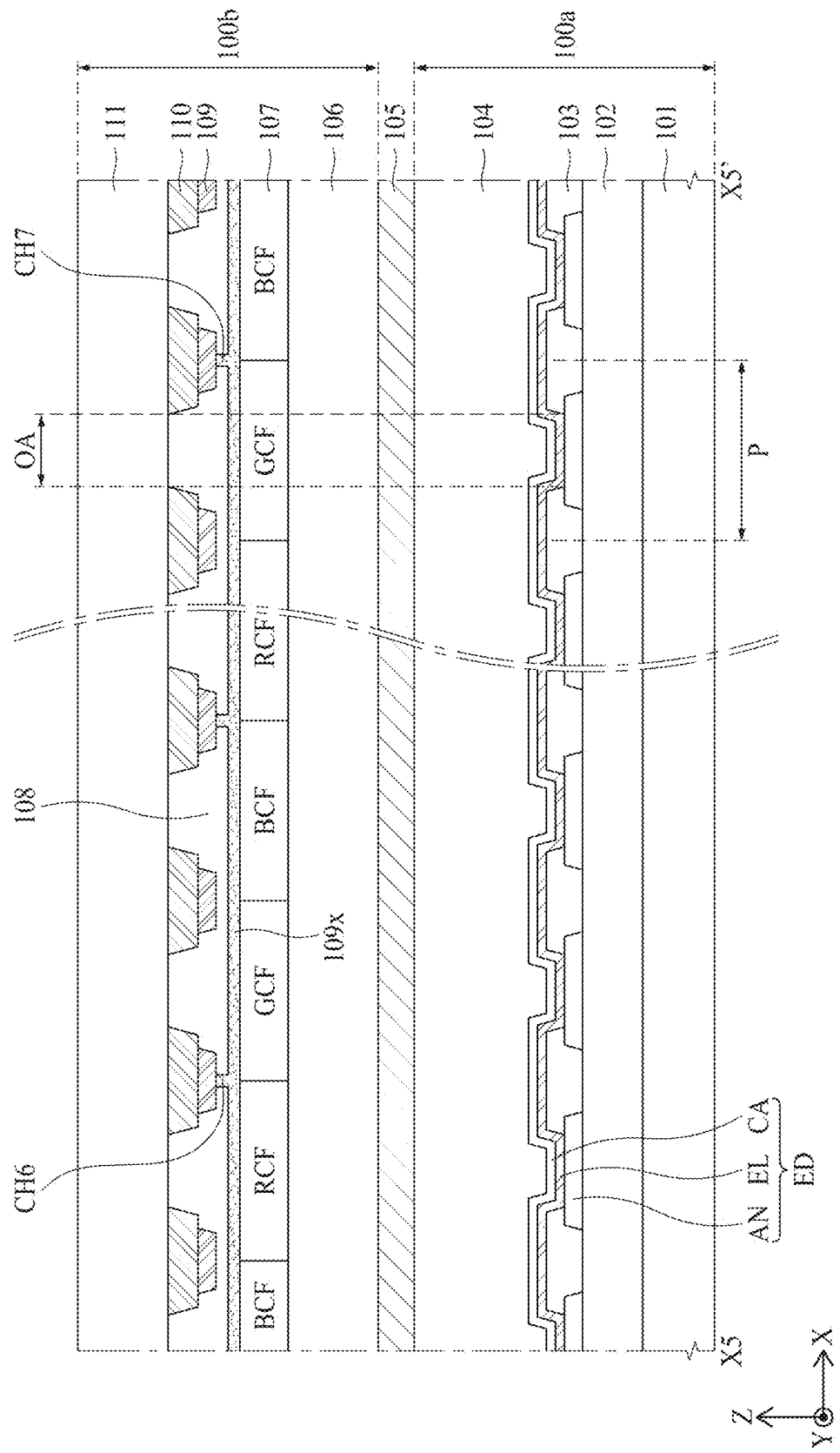
FIG. 18 is an exemplary diagram illustrating a cross-sectional surface taken along line X5-X5' illustrated in FIG. 17 according to an embodiment of the present disclosure.

FIG. 15 is another plan view of a first area or a second area illustrated in FIG. 7 according to one embodiment, FIG. 16 is an exemplary diagram illustrating a cross-sectional surface taken along line X4-X4' illustrated in FIG. 15 according to one embodiment, FIG. 17 is another plan view of a first area or a second area illustrated in FIG. 7 according to one embodiment, and FIG. 18 is an exemplary diagram illustrating a cross-sectional surface taken along line X5-X5' illustrated in FIG. 17 according to one embodiment. In the following descriptions, details that are the same as or similar to details described with reference to FIGS. 1 to 14 are omitted or briefly described.

As described above, the touch panel 100b includes the black matrix BM including the black matrix lines 110 that are provided at the lower end of the encapsulation substrate 111 and surrounding the areas corresponding to the opening portions OA, the black matrix electrodes 109 overlapping the black matrix lines 110, the insulation layer 108 covering the black matrix lines 110 and the black matrix electrodes 109, and the color filters RCF, GCF, and BCF that are provided at the lower end of the insulation layer 108 and face the array panel 100a.

In this case, the sub-touch driving electrodes STX, which are spaced apart from each other along the first direction X, can be connected by routing lines STXL extending to the non-touch area NTA. Also, the black matrix electrodes 109, which are spaced apart from each other along the first direction X, among the black matrix electrodes 109 configuring the touch receiving electrode RX can be connected by the touch receiving bridge RXCL. Moreover, the black matrix electrodes 109, which are spaced apart from each other along the first direction X, among the black matrix electrodes 109 configuring the sub-touch driving electrode STX can be connected by the touch driving bridge TXBR.

Also, in a display apparatus according to an embodiment of the present disclosure, a transparent touch electrode 109y can be further included, as illustrated in FIGS. 15 to 18, to increase touch sensitivity.

First, for example, when FIGS. 15 to 18 illustrate the first area AR1 of the touch panel 100*b* illustrated in FIG. 7, the black matrix electrodes 109 illustrated in FIGS. 15 to 18 can configure the touch electrode TE included in the first touch driving electrode TX1, and particularly, can configure the 1a-th sub-touch driving electrode STX1*a*.

The 1a-th sub-touch driving electrode STX1*a* configuring the first touch driving electrode TX1 can further include a transparent touch electrode 109*y*, as illustrated in FIGS. 15 to 18. In this case, the transparent touch electrode 109*y* can be provided in an area corresponding to the opening portion OA, and can be provided along the second direction Y.

The transparent touch electrode 109*y* can be provided between the insulation layer 108 and the color filter CF, as illustrated in FIG. 16.

In this case, a black matrix electrode 109 configuring the 1a-th sub-touch driving electrode STX1*a* and provided in the first direction X can be connected to the transparent touch electrode 109*y* through a fifth contact hole CH5 provided in the insulation layer 108.

Also, the transparent touch electrode 109*y* can be provided between the insulation layer 108 and the color filter CF. A connection transparent touch electrode 109*x* can be provided in the first sub-touch driving electrode STX1 configuring the first touch driving electrode TX1.

For example, the connection transparent touch electrode 109*x* can overlap at least one black matrix electrode 109 provided in the first direction X, as illustrated in FIG. 17, and particularly, can be provided between at least one black matrix electrode 109 provided in the first direction X and the color filter CF, as illustrated in FIG. 18.

In this case, the connection transparent touch electrode 109*x* can be provided on the lower end of the insulation layer 108 and can be provided on the same layer as the transparent touch electrode 109*y*.

The connection transparent touch electrode 109*x* can be connected to at least one of the black matrix electrodes 109 configuring the first touch driving electrode TX1.

That is, the connection transparent touch electrode 109*x* can be connected to at least one black matrix electrode 109 through at least one sixth contact hole CH6 provided in the insulation layer 108.

To provide an additional description, for example, the 1a-th sub-touch driving electrode STX1*a* can further include at least one transparent touch electrode 109*y* provided in the opening portion OA and at least one connection transparent touch electrode 109*x*.

The transparent touch electrode 109*y* can be provided along the second direction Y, as illustrated in FIG. 15. However, the transparent touch electrode 109*y* can be provided along the first direction X.

The transparent touch electrode 109*y* can be provided in all the opening portions OA, but can be provided in at least one opening portion OA in consideration of an area of the opening portion OA.

For example, when an area of the green pixel G among the red pixel R, the green pixel G, and the blue pixel B is the smallest, or a luminance of the green pixel G is the lowest, the transparent touch electrode 109*y* may not be provided in the green pixel G.

The transparent touch electrode 109*y* can be electrically connected to the black matrix electrode 109 extending in the first direction X, as illustrated in FIGS. 15 and 16.

For example, the transparent touch electrode 109*y* can be connected to at least one of the upper black matrix electrodes 109*c* and lower black matrix electrodes 109*d*.

Also, the 1a-th sub-touch driving electrode STX1*a* can further include the connection transparent touch electrode 109*x* connected to the transparent touch electrode 109*y*, as illustrated in FIG. 17.

The connection transparent touch electrode 109*x* can be formed on the same layer as the transparent touch electrode 109*y* and can be connected to the transparent touch electrode 109*y*.

The connection transparent touch electrode 109*x* can be provided along the upper black matrix electrodes 109*c* or along the lower black matrix electrodes 109*d*.

The connection transparent touch electrode 109*x* can be connected to at least one of the upper black matrix electrodes 109*c* and lower black matrix electrodes 109*d*.

However, the connection transparent touch electrode 109*x* can be connected to at least one of the left black matrix electrodes 109*a* and right black matrix electrodes 109*b*, as illustrated in FIG. 17.

Second, for example, when FIGS. 15 to 18 illustrate the second area AR2 of the touch panel 100*b* illustrated in FIG. 7, the black matrix electrodes 109 illustrated in FIGS. 15 to 18 can configure the 1a-th touch receiving electrode RX1*a*.

In this case, the 1a-th touch receiving electrode RX1*a* can further include at least one of the touch transparent electrode 109*y* and the connection touch transparent electrode 109*x* as described above.

That is, each of the sub-touch driving electrodes STX can further include at least one of the touch transparent electrode 109*y* and the connection touch transparent electrode 109*x*, and each of the touch receiving electrodes RX can also further include at least one of the touch transparent electrode 109*y* and the connection touch transparent electrode 109*x*.

Hereinafter, features of a display apparatus according to an embodiment of the present disclosure described above are summarized.

First, a display apparatus according to an embodiment of the present disclosure has a structure in which the touch panel 100*b* is bonded to the upper end of the array panel 100*a*, and particularly, can be applied to a structure in which it is difficult to form a touch electrode directly on an upper end of the encapsulation layer of the array panel. For example, a display apparatus according to an embodiment of the present disclosure can be applied to a large-area display apparatus, a transparent display apparatus, and a high-resolution display apparatus.

Next, in a display apparatus according to an embodiment of the present disclosure, touch electrodes can be provided on a plane of the encapsulation substrate 111. The touch electrodes can be provided in a mutual-cap method or can be provided in a self-cap method. The touch panel 100*b* including the encapsulation substrate 111 provided with the touch electrodes can be attached to the array panel 100*a* by using a side bonding technology.

According to the side bonding technology, as illustrated in FIG. 8, the side pads 802 connected to the touch electrodes TE can be exposed to the side surface of the touch panel 100*b*, and can be connected to the touch driver 800 through a printed circuit board 810 attached to the side surface.

Next, according to a display apparatus according to an embodiment of the present disclosure, a decrease in transmittance can be minimized, and an increase in a bezel can be minimized. Accordingly, a large-area display apparatus capable of sensing a touch can be implemented.

Next, when mutual-type touch driving electrodes TX are provided in a large-area display apparatus, because a length of the touch driving electrodes TX is long, a magnitude of the touch driving signal can vary depending on the positions of the touch driving electrodes TX.

To prevent this problem, in a display apparatus according to an embodiment of the present disclosure, as described with reference to FIG. 7, the routing line STXL can be provided in each of the sub-touch driving electrodes STX configuring the touch driving electrode TX. In this case, the routing lines STXL can be provided in parallel along the first direction X of the touch panel 100b.

The routing lines STXL extending in the second direction Y can be connected to each other in the non-touch area NTA, and can be connected to the touch driving electrode line TXL.

Therefore, the sub-touch driving electrodes STX configuring the touch driving electrode TX can be electrically connected.

Next, in a display apparatus according to an embodiment of the present disclosure, black matrix electrodes 109 configuring the touch electrode TE are provided on the black matrix lines 110 configuring the black matrix BM. Accordingly, a decrease in transmittance due to the touch electrode TE can be minimized or at least reduced.

In particular, when a display apparatus according to an embodiment of the present disclosure is a low-resolution display apparatus, the transparent touch electrode 109y can be further formed in the opening portion OA to improve the sensitivity of the touch electrode TE.

The transparent touch electrode 109y can be formed of, for example, a transparent metal such as an indium tin oxide (ITO).

In this case, as illustrated in FIGS. 16 and 18, the transparent touch electrode 109y can be provided between the insulation layer 108 and the color filter CF, or between the overcoating layer 106 and the color filter CF.

Also, the transparent touch electrode 109y can be provided between the encapsulation substrate 111 and the black matrix lines 110.

Next, in a display apparatus according to an embodiment of the present disclosure, the touch driving electrode TX can include the black matrix electrodes 109 configuring the sub-touch driving electrode STX and the touch driving bridge TXBR for connecting the black matrix electrodes 109 spaced apart from each other among the black matrix electrodes 109 configuring the sub-touch driving electrode STX.

Also, in a display apparatus according to an embodiment of the present disclosure, the touch receiving electrode RX can include the black matrix electrodes 109 and the touch receiving bridge RXCL for connecting the black matrix electrodes 109 spaced apart from each other.

In this case, the routing lines SXTL connected to the sub-touch driving electrodes STX extend to the non-touch area NTA corresponding to the non-display area NDA along the black matrix lines 110 provided in the second direction Y and can be connected to the touch driving electrode line TXL.

Moreover, the touch receiving electrode lines RXL connected to the touch receiving electrodes RX can also extend to the non-touch area NTA along the black matrix lines 110 provided in the second direction Y.

Next, as illustrated in FIG. 10, the black matrix electrodes 109 can be provided at the lower end of the black matrix lines 110, or as illustrated in FIG. 11, can be provided on the encapsulation substrate 111 and then covered by the black matrix lines 110.

In this case, in order to minimize or at least reduce reflection in the black matrix electrodes 109, an oxide film metal can be first deposited on the lower surface of the encapsulation substrate 111. The oxide film metal can be, for example, at least one of MoTi, MoOx, Ti, TiOx, and CuSix.

Finally, the transparent touch electrode 109y can be formed of, for example, a transparent metal such as an indium tin oxide (ITO).

In this case, as illustrated in FIGS. 16 and 18, the transparent touch electrode 109y can be provided between the insulation layer 108 and the color filter CF, or between the overcoating layer 106 and the color filter CF.

Also, the transparent touch electrode 109y can be provided between the encapsulation substrate 111 and the black matrix lines 110.

Moreover, the touch driving bridge TXBR and the touch receiving bridge RXCL can be provided between the overcoating layer 106 and the color filter CF, or between the encapsulation substrate 111 and the black matrix lines 110.

The features of the display apparatus according to an embodiment of the present disclosure are briefly summarized as follows.

A display apparatus according to an embodiment of the present disclosure includes an array panel provided with pixels including opening portions through which light is output; and a touch panel provided on the array panel and including touch electrodes, wherein the touch panel includes: color filters provided to overlap the pixels; an insulation layer provided on the color filters; a black matrix provided on the insulation layer and including black matrix lines surrounding an area corresponding to the opening portions; black matrix electrodes overlapping the black matrix lines; and an encapsulation substrate provided on the black matrix, wherein each of the touch electrodes includes at least two black matrix electrodes connected to each other.

The black matrix electrodes are provided between the black matrix lines and the insulation layer.

The black matrix electrodes are provided between the encapsulation substrate and the black matrix lines.

Touch panel includes touch driving electrodes and touch receiving electrodes, each of the touch driving electrodes includes sub-touch driving electrodes provided along a first direction of the touch panel, a portion of the touch electrodes are the sub-touch driving electrodes and another portion of the touch electrodes are the touch receiving electrodes, and the touch driving electrodes are provided to be spaced apart from each other along a second direction of the touch panel.

Each of first routing lines connected to first sub-touch driving electrodes configuring a first touch driving electrode among the touch driving electrodes extends along the second direction, and each of the first routing lines includes black matrix electrodes provided in a row in the second direction and connected to each other.

Each of second sub-touch driving electrodes configuring a second touch driving electrode among the touch driving electrodes includes black matrix electrodes, and each of the first routing lines is provided parallel to black matrix electrodes which are provided in a row along the second direction in the second sub-touch driving electrode and connected to each other.

Each of the touch receiving electrodes extends along the second direction between two sub-touch driving electrodes spaced apart from each other along the first direction.

Each of the touch receiving electrodes includes black matrix electrodes which are provided in a row along the second direction and connected to each other.

Each of the touch receiving electrodes is connected to a touch receiving electrode line extending along the second direction, and the touch receiving electrode line includes black matrix electrodes which are provided in a row along the second direction and connected to each other.

The touch receiving electrode line is provided between two black matrix electrodes provided parallel to each other along the first direction, among black matrix electrodes configuring a touch receiving electrode, and the touch panel further includes a touch receiving bridge overlapping the touch receiving electrode line and connected to the two black matrix electrodes.

A first sub-touch driving electrode, which configure a first touch driving electrode among the touch driving electrodes, further includes a transparent touch electrode, and the transparent touch electrode is provided in an area corresponding to an opening portion and provided along the second direction.

The transparent touch electrode is provided between the insulation layer and the color filter, and a black matrix electrode included in the first sub-touch driving electrode and provided in the first direction is connected to the transparent touch electrode.

The first sub-touch driving electrode further includes a connection transparent touch electrode, the transparent touch electrode is provided between the insulation layer and the color filter, the connection transparent touch electrode is provided between at least one black matrix electrode provided in the first direction and the color filter, and the connection transparent touch electrode is connected to the transparent touch electrode.

The connection transparent touch electrode is connected to at least one of black matrix electrodes included in the first sub-touch driving electrode.

The touch panel further includes side pads which are exposed to the side surface of the touch panel and electrically connected to the touch electrodes, and the side pads are electrically connected to a printed circuit board on which a touch driver is mounted.

Black matrix electrodes spaced apart from each other among black matrix electrodes forming a sub-touch driving electrode are connected by a touch driving bridge, and black matrix electrodes spaced apart from each other among black matrix electrodes forming a touch receiving electrode are connected by a touch receiving bridge.

At least one of the touch driving bridge and the touch receiving bridge is formed on a layer different from the black matrix electrodes.

According to a display apparatus according to an embodiment of the present disclosure, touch electrodes can be provided to overlap a black matrix. Accordingly, a touch can be sensed without reducing the transmittance of a display panel.

According to a display apparatus according to an embodiment of the present disclosure, touch electrodes can also be provided in a large display panel where it is difficult to dispose touch electrodes on an upper end of an encapsulation layer of a display panel.

Accordingly, a touch can be sensed in various sizes and various types of display apparatuses, and accordingly, the utilization of the display apparatus can be increased.

The display apparatus according to the present disclosure can be applied to all electronic devices including a display panel. For example, the display apparatus according to the present disclosure can be applied to a virtual reality (VR) device, an augmented reality (AR) device, a mobile device, a video phone, a smart watch, a watch phone, or a wearable device, foldable device, rollable device, bendable device, flexible device, curved device, electronic notebook, e-book, PMP (portable multimedia player), PDA (personal digital assistant), MP3 player, mobile medical device, desktop PC, laptop PC, netbook computer, workstation, navigation, car navigation, vehicle display devices, televisions, wall paper display devices, signage devices, game devices, laptops, monitors, cameras, camcorders, and home appliances.

The above-described feature, structure, and effect of the present disclosure are included in at least one embodiment of the present disclosure, but are not limited to only one embodiment. Furthermore, the feature, structure, and effect described in at least one embodiment of the present disclosure can be implemented through combination or modification of other embodiments by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the present disclosure.

What is claimed is:

1. A display apparatus comprising:
   an array panel having pixels including opening portions through which light is output; and
   a touch panel on the array panel, the touch panel including:
   touch electrodes,
   color filters that overlap the pixels;
   an insulation layer on the color filters;
   a black matrix on the insulation layer, the black matrix including black matrix lines surrounding an area corresponding to the opening portions;
   black matrix electrodes overlapping the black matrix lines; and
   an encapsulation substrate on the black matrix,
   wherein each of the touch electrodes includes at least two black matrix electrodes connected to each other,
   the touch panel includes touch driving electrodes and touch receiving electrodes,
   each of the touch driving electrodes includes sub-touch driving electrodes along a first direction of the touch panel,
   a portion of the touch electrodes are the sub-touch driving electrodes and another portion of the touch electrodes are the touch receiving electrodes, and
   the touch driving electrodes are spaced apart from each other along a second direction of the touch panel.

2. The display apparatus of claim 1, wherein the black matrix electrodes are between the black matrix lines and the insulation layer.

3. The display apparatus of claim 1, wherein the black matrix electrodes are between the encapsulation substrate and the black matrix lines.

4. The display apparatus of claim 1, wherein each of first routing lines connected to first sub-touch driving electrodes configuring a first touch driving electrode among the touch driving electrodes extends along the second direction, and each of the first routing lines includes black matrix electrodes arranged in a row in the second direction and connected to each other.

5. The display apparatus of claim 4, wherein each of second sub-touch driving electrodes configuring a second touch driving electrode among the touch driving electrodes includes black matrix electrodes, and each of the first routing lines is parallel to black matrix electrodes which are arranged in a row along the second direction in the second sub-touch driving electrode and connected to each other.

6. The display apparatus of claim 1, wherein each of the touch receiving electrodes extends along the second direction between two sub-touch driving electrodes spaced apart from each other along the first direction.

7. The display apparatus of claim 6, wherein each of the touch receiving electrodes includes black matrix electrodes which are arranged in a row along the second direction and connected to each other.

8. The display apparatus of claim 7, wherein each of the touch receiving electrodes is connected to a touch receiving electrode line extending along the second direction, and the touch receiving electrode line includes black matrix electrodes which are arranged in a row along the second direction and connected to each other.

9. The display apparatus of claim 8, wherein the touch receiving electrode line is between two black matrix electrodes arranged in parallel to each other along the first direction, among black matrix electrodes configuring a touch receiving electrode, and
the touch panel further includes a touch receiving bridge overlapping the touch receiving electrode line and connected to the two black matrix electrodes.

10. The display apparatus of claim 1, wherein a first sub-touch driving electrode, which configure a first touch driving electrode among the touch driving electrodes, further includes a transparent touch electrode, and the transparent touch electrode is in an area corresponding to an opening portion and provided along the second direction.

11. The display apparatus of claim 10, wherein the transparent touch electrode is between the insulation layer and the color filters, and a black matrix electrode included in the first sub-touch driving electrode and arranged in the first direction is connected to the transparent touch electrode.

12. The display apparatus of claim 10, wherein the first sub-touch driving electrode further includes a connection transparent touch electrode,
the transparent touch electrode is between the insulation layer and the color filters,
the connection transparent touch electrode is between at least one black matrix electrode provided in the first direction and the color filters, and
the connection transparent touch electrode is connected to the transparent touch electrode.

13. The display apparatus of claim 12, wherein the connection transparent touch electrode is connected to at least one of black matrix electrodes included in the first sub-touch driving electrode.

14. The display apparatus of claim 1, wherein the touch panel further includes side pads which are exposed to a side surface of the touch panel and electrically connected to the touch electrodes, and the side pads are electrically connected to a printed circuit board on which a touch driver is mounted.

15. The display apparatus of claim 1, wherein black matrix electrodes spaced apart from each other among black matrix electrodes forming a sub-touch driving electrode are connected by a touch driving bridge, and black matrix electrodes spaced apart from each other among black matrix electrodes forming a touch receiving electrode are connected by a touch receiving bridge.

16. The display apparatus of claim 15, wherein at least one of the touch driving bridge and the touch receiving bridge is on a layer different from the black matrix electrodes.

17. The display apparatus of claim 3, wherein each of the black matrix electrodes is constructed to be embedded in a corresponding black matrix line.

* * * * *